US 9,492,753 B2

(12) United States Patent
Takahashi

(10) Patent No.: US 9,492,753 B2
(45) Date of Patent: Nov. 15, 2016

(54) GAME CONTROL DEVICE, PROGRAM, RECORDING MEDIUM, GAME CONTROL METHOD, GAME CONTROL SYSTEM

(71) Applicant: KONAMI DIGITAL ENTERTAINMENT CO., LTD., Minato-ku, Tokyo (JP)

(72) Inventor: Kazuya Takahashi, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 129 days.

(21) Appl. No.: 14/379,265

(22) PCT Filed: Nov. 27, 2012

(86) PCT No.: PCT/JP2012/007595
§ 371 (c)(1),
(2) Date: Aug. 15, 2014

(87) PCT Pub. No.: WO2013/121488
PCT Pub. Date: Aug. 22, 2013

(65) Prior Publication Data
US 2015/0011318 A1    Jan. 8, 2015

(30) Foreign Application Priority Data
Feb. 17, 2012 (JP) ................. 2012-032622

(51) Int. Cl.
*A63F 9/24* (2006.01)
*A63F 13/73* (2014.01)
(Continued)

(52) U.S. Cl.
CPC .......... *A63F 13/73* (2014.09); *A63F 13/2145* (2014.09); *A63F 13/26* (2014.09); *A63F 13/30* (2014.09);
(Continued)

(58) Field of Classification Search
None
See application file for complete search history.

(56) References Cited

U.S. PATENT DOCUMENTS

2006/0247011 A1* 11/2006 Gagner ........................... 463/20
2008/0113770 A1*  5/2008 Gelber et al. ................... 463/25
2008/0200241 A1*  8/2008 Davies ............................ 463/25

FOREIGN PATENT DOCUMENTS

JP      2010-515524 A    5/2010
WO     2010062617 A1   6/2010

OTHER PUBLICATIONS

International Search Report in PCT/JP2012/007595 dated Mar. 5, 2013.
Appli Style, vol. 5 (Eastpress Co., Ltd.) p. 7 dated Nov. 2011.

* cited by examiner

*Primary Examiner* — Paul A D'Agostino
(74) *Attorney, Agent, or Firm* — Global IP Counselors, LLP

(57) ABSTRACT

A game control device includes an accepter configured to accept an access request including user-specific user identification information from at least one communication terminal; a detector configured to detect accesses from a plurality of communication terminals that are associated with identical user identification information, the plurality of communication terminals including a first communication terminal and a second communication terminal; a game executer configured to execute a game for a user of user identification information after access from any one of the plurality of communication terminals based on user identification information; and a game controller configured to transmit game data of the game being executed to the second communication terminal in response to an operational input to the first communication terminal, after the detector (Continued)

detects the accesses from the plurality of communication terminals that are associated with the identical user identification information.

9 Claims, 21 Drawing Sheets

(51) Int. Cl.
    *A63F 13/493*    (2014.01)
    *A63F 13/30*    (2014.01)
    *A63F 13/26*    (2014.01)
    *A63F 13/2145*    (2014.01)
    *A63F 13/92*    (2014.01)
    *A63F 13/31*    (2014.01)
    *A63F 13/335*    (2014.01)
    *A63F 13/79*    (2014.01)
    *A63F 13/77*    (2014.01)

(52) U.S. Cl.
    CPC ............. *A63F 13/31* (2014.09); *A63F 13/335* (2014.09); *A63F 13/493* (2014.09); *A63F 13/77* (2014.09); *A63F 13/79* (2014.09); *A63F 13/92* (2014.09)

Mobile terminal 10

| User ID | Password | Identification Information | Terminal information of main-terminal | Terminal information of sub-terminal |
|---|---|---|---|---|
| 012345 | knm001 | xxxxxxxxxx | | |

FIG.6

Processing after user logins

| User ID | Password | Identification Information | Terminal information of main-terminal | Terminal information of sub-terminal | Friend user ID(s) |
|---|---|---|---|---|---|
| 012345 | knm001 | xxxxxxxxxxx | | | |

FIG.14

GAME CONTROL DEVICE, PROGRAM, RECORDING MEDIUM, GAME CONTROL METHOD, GAME CONTROL SYSTEM

CROSS-REFERENCE TO RELATED APPLICATION

The present invention is based upon and claims the benefit of priority of the prior Japanese Patent Application No. 2012-032622, filed on Feb. 17, 2012, the entire contents of which are incorporated herein by reference.

FIELD

The present invention relates to a technique for controlling game progress with a communication terminal of a user via a communication network.

BACKGROUND

Recently, so-called social network games have become widespread which run on game applications created on the basis of operating environments such as application programming interfaces (API) operated on a web browser in a social networking service (SNS) provided by a particular service provider. Social network games may be defined as a type of online game played among a plurality of unspecified users who are communicating with each other. A player who has a communication terminal connectable to the Internet and with a web browser installed is able to enjoy network games regardless of time or location. One characteristic of the above-mentioned social network game is that communication functions for socializing between players are more sophisticated than those of conventional online games. For example, in social network games, besides collaborative play with other players (friends), players exchange information through communication with friends such as greetings and contacts, and give or exchange items in the game with friends.

Among the social network games described above, a social network game is known which is configured such that a user is able to play each part of a plurality of parts. For example, in a Japanese game magazine (Appli Style, Vol. 5 (Eastpress Co., Ltd.) page 7), a social network game (Dragon Collection (Registered trademark) including parts of "Quest", "Battle", "Combination" and "Drawing" is described. "Drawing" corresponds to a drawing function with which a user obtains cards or items, etc. usable in the game.

SUMMARY OF THE INVENTION

A user has enjoyed playing social network games as described above by use of mobile communication terminal irrespective of where the user is; however, it is difficult to realize a variety of types or forms of games on the assumption that the user uses a single communication terminal.

The present invention has been devised in consideration of the above. An object of the present invention is to provide a game control device, a non-transitory computer-readable recording medium, a game control method, and a game control system that allows a variety of types or forms of games by use of a plurality of communication terminals.

An aspect of the present invention is a game control device, the device being connected through a communication network to communication terminals, the device comprising:

an accepter configured to accept an access request including user-specific user identification information from at least one communication terminal;

a detector configured to detect accesses from a plurality of communication terminals that are associated with identical user identification information, the plurality of communication terminals including a first communication terminal and a second communication terminal;

a game executor configured to execute a game for a user of user identification information after access from any one of the plurality of communication terminals based on user identification information; and a game controller configured to transmit game data of the game being executed to the second communication terminal in response to an operational input to the first communication terminal, after the detector detects the accesses from the plurality of communication terminals that are associated with the identical user identification information.

In this game control device, the game controller may transmit first game data of the game being executed to the first communication terminal, and the game controller transmits second game data of the game being executed to the second communication terminal in response to an operational input to the first communication terminal. The second game data is different from the first game data.

This game control device may further include a correlator configured to correlate first user identification information and second user identification information in the game in response to a request from a communication terminal performing access based on the first user identification information or the second user identification information, wherein an operational input is input to the communication terminal performing access based on one of the first user identification information and the second user identification information, and the game controller transmits game data of the game being executed to a communication terminal performing access based on other of the first user identification information and the second user identification information in response to the operational input.

In this game control device, if the first user identification information and the second user identification information are correlated by the correlator, the game controller transmits data for viewing a game result based on the first user identification information and the second user identification information to the communication terminal performing access based on the first user identification information or the second user identification information.

BRIEF DESCRIPTION OF THE DRAWINGS

Referring now to the attached drawings which form a part of this disclosure:

FIG. 6 illustrates an exemplary configuration of a user database included in the database server;

FIG. 14 is an exemplary configuration of a database server according to the second embodiment;

DETAILED DESCRIPTION OF THE EMBODIMENTS (1) First Embodiment

The first embodiment of a game control system according to the present invention will be described below.

(1-1) Configuration of Game Control System

Figure 1:
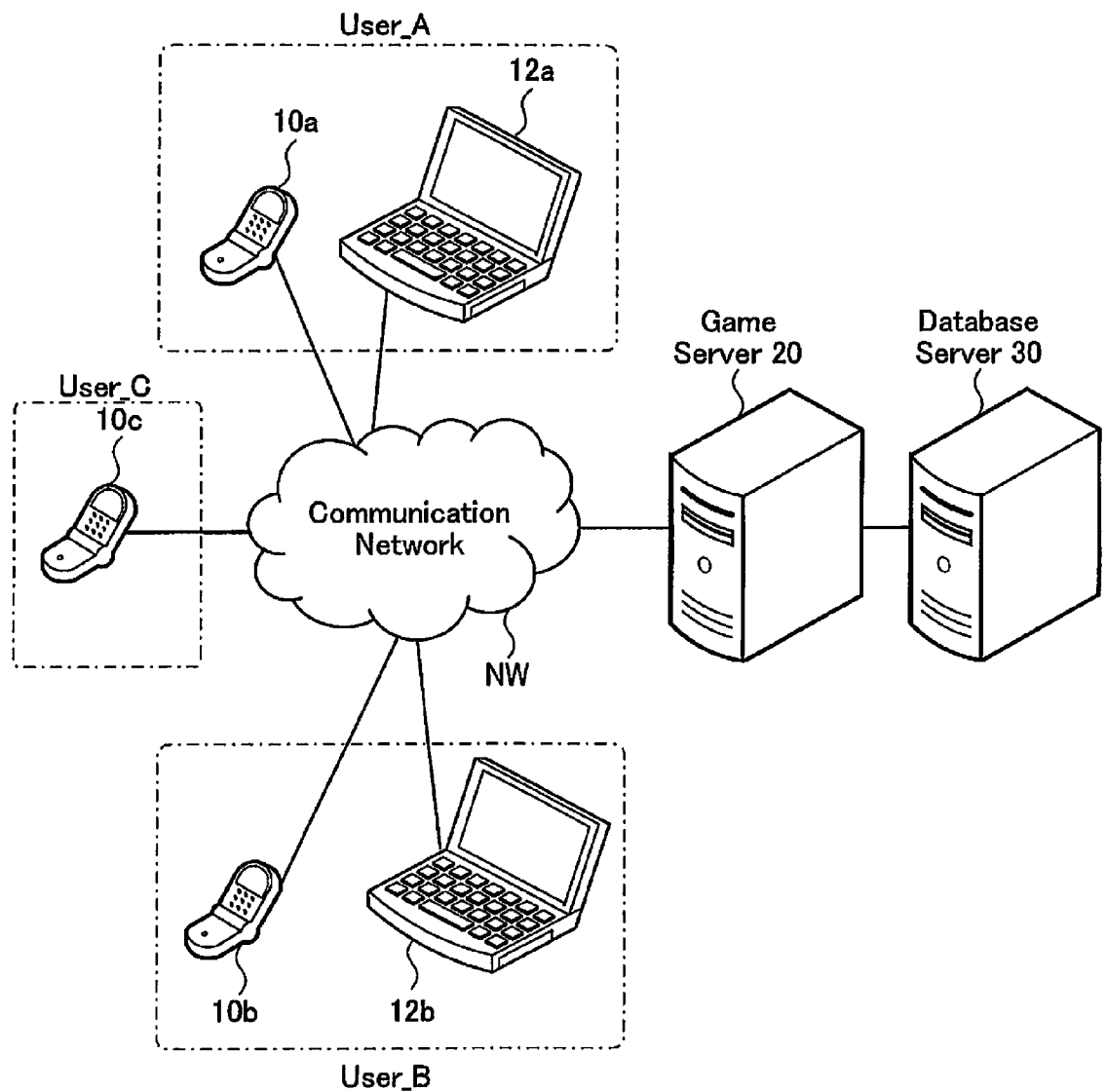
FIG. 1 illustrates a basic configuration diagram of a game control system according to a first embodiment.

FIG. 1 represents an exemplary system configuration of a game control system according to the present embodiment. As illustrated in FIG. 1, the game control system includes a plurality of communication terminals that are connectable to a communication network NW such as the Internet, a game server 20 that is connectable to the communication network NW, and a database server 30. In FIG. 1, communication terminals 10a, 12a of User_A, communication terminals 10b, 12b of User_B, and a communication terminals 10c of User_C are illustrated as an example of a plurality of communication terminals. Each of the communication terminals is a communication terminal operated by an individual user, such as a mobile terminal (including a smart phone), a personal digital assistant (PDA), a personal computer, or a television receiver including a two-way communication function (including a so-called multi-functional smart TV).

In the example illustrated in FIG. 1, the communication terminals 10a, 10b and 10c are mobile phones. The communication terminals 10a, 10b and 10c are therefore called as mobile terminals 10a, 10b and 10c in the following explanation. The mobile terminals 10a, 10b and 10c may be called as mobile terminal 10 when they are commonly referred to. In the example illustrated in FIG. 1, the communication terminals 12a, 12b are personal computers. The communication terminals 12a, 12b are therefore called as PCs 12a, 12b in the following explanation. The PCs 12a, 12b may be called as PC 12 when they are commonly referred to.

In this game control system, a case is assumed in which there are accesses from a plurality of communication terminals to the game server 20 for each user. In the case in which there have been accesses from a plurality of communication terminals of a user to the game server 20, the game server 20 identifies a main-terminal and a sub-terminal in executing a game provided by the game server 20. The main-terminal is a communication terminal that receives from the game server 20 game data of a game being played by a user. The main-terminal is a communication terminal that displays primary game images of the game being executed, for example. The sub-terminal is a communication terminal that receives operational inputs from the user in the game being played by the user. For example, the sub-terminal is a communication terminal that is held by the user for operation. As described later, the game data of the game being played by the user may be received from the game server 20.

In the example of FIG. 1, the case is illustrated in which there are accesses to the game server 20 from respective plurality of communication terminals of User_A and User_B. In this case, for User_A and User_B, the PC 12a and the PC 12b are main-terminals of User_A and User_B respectively, while the mobile terminal 10a and the mobile terminal 10b are sub-terminals of User_A and User_B respectively.

Note that, in the example of FIG. 1, the case is illustrated in which there is an access to the game server 20 from a single communication terminal (mobile terminal 10c) of User_C. In this case, the mobile terminal 10c of the user is identified as both main-terminal and sub-terminal.

With this game control system, the game server 20 is configured to be able to communicate with the mobile terminal 10 and the PC 12 as clients and provides the communication terminals with gaming service. The game server 20 is embedded with a program that is operable on a web browser as a game application. The database server 30 stores a variety of information for executing the games as described below. The database server 30 is connected to the game servers 20 by means of a wired connection for example for reading and writing the information.

The mobile terminal 10 and the PCs 12 each includes a web browser that is able to display a web page provided by the game server 20. A user plays a game by operating the sub-terminal which is either of the mobile terminal 10 and PC 12.

In addition to the game server 20, an authentication server may be provided for authenticating respective users of the communication terminals, although not illustrated in FIG. 1. Further, in the case in which a plurality of the game servers 20 is provided for receiving accesses from a large number of the communication terminals, a load balancer may be provided for regulating loads among the plurality of game servers 20. Furthermore, the game server 20 may be configured as a single server device or as a plurality of server devices to which functions are distributed.

(1-2) Communication Terminal Configuration

The mobile terminal 10 will be hereinafter explained with reference to FIGS. 2A, 2B, and 3.

Figure 2A:
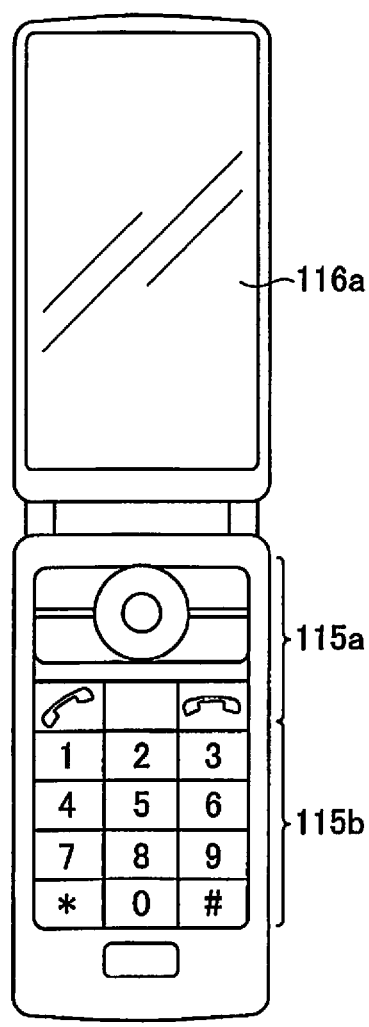
FIG. 2A illustrates an external appearance example of a communication terminal according to the first embodiment.
Figure 2B:
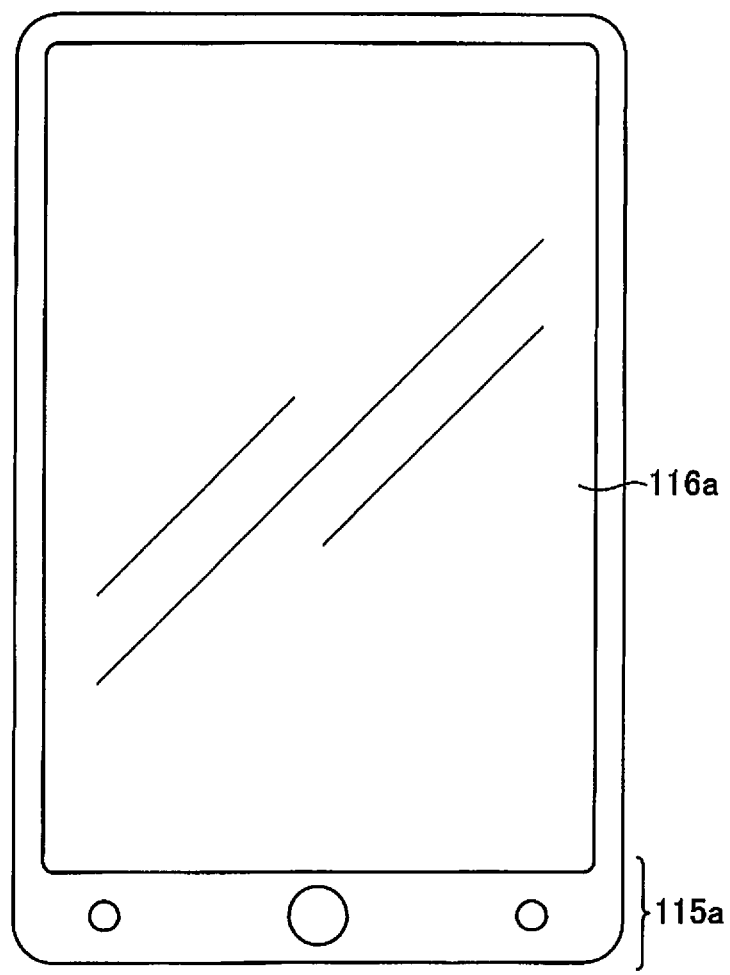
FIG. 2B illustrates an external appearance example of a communication terminal according to the first embodiment.

FIGS. 2A and 2B each illustrates exemplary appearances of the mobile terminal 10. FIG. 2A illustrates a communication terminal with a button input system such as, for example, a foldable communication terminal (mobile telephone). FIG. 2B illustrates a communication terminal with a touch panel input system such as a smartphone. FIG. 3 is a configuration block diagram of the mobile terminal 10.

Figure 3:
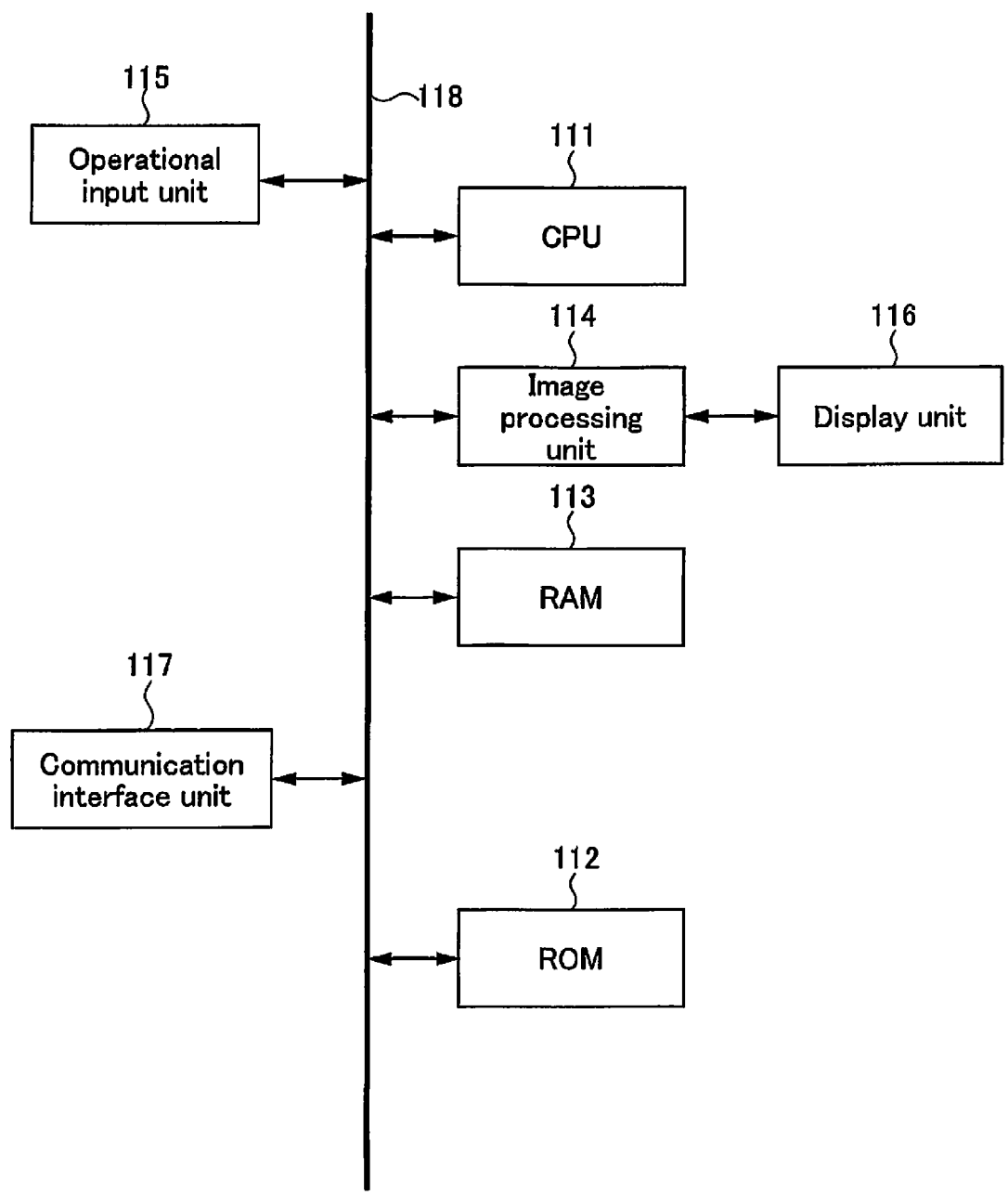
FIG. 3 is a block diagram of a configuration of a communication terminal according to the first embodiment.

As represented in FIG. 3, each mobile terminal 10 includes a central processing unit (CPU) 111, a read-only memory (ROM) 112, a random access memory (RAM) 113, an image processing unit 114, an operational input unit 115, a display unit 116, and a communication interface unit 117 as a signal transmission and reception unit. Further, each mobile terminal 10 includes a bus 118 for transmitting control signals or data signals between the components.

The CPU 111 loads a web browser stored in the ROM 112 into the RAM 113, runs the web browser therein, and then executes web access to the game server 20 according to HTTP (HyperText Transfer Protocol). For example, the CPU 111 acquires data for displaying a web page from the game server 20 through the communication interface unit 117 on the basis of an appropriately specified uniform resource locator (URL) that is inputted by a user using the operational input unit 115 and the like. The acquired data is data of objects such as images associated with a hypertext markup language (HTML) document and the HTML document (hereinafter collectively referred to as "HTML data" on an as-needed basis). The CPU 111 then interprets the acquired HTML data. It should be noted that each mobile terminal 10 may be embedded with a variety of plug-ins for extending browsing functions of the web browser.

In acquiring the HTML data, the CPU 111 transmits an access request message to the game server 20 through the communication interface unit 117. The access request message herein includes either a user ID (user identification information) preliminarily registered or a user ID inputted through the operational input unit 115.

The web browser displays on the display unit 116 a web page provided by the game server 20 through the image processing unit 114 on the basis of the acquired HTML data. Further, if either a Hyperlink or a menu on the web page is selected by a user operating the operational input unit 115, the web browser then transmits a request to the game server 20 (that is, a request for updating a web page; HTTP request) to transmit new HTML data for displaying the web page in accordance with the selection.

The image processing unit 114 displays a web page on the display unit 116 on the basis of image data for display to be provided from the CPU 111 as an analysis result of the HTML data. For example, the display unit 116 is a liquid crystal display (LCD) monitor including thin-film transistors arranged in a matrix manner on a pixel-by-pixel basis. The display unit 116 displays the image of the web page by driving the thin-film transistors on the basis of the image data for display on a display screen 116a.

In the case in which the mobile terminal 10 is a communication terminal to which a button input method (see FIG. 2A) applies, the operational input unit 15 is equipped with a button group 115a and a button group 115b. The button group 115a includes a plurality of operational input buttons such as a directional instruction button and a confirmation button for receiving user operational inputs. The button group 115b includes a plurality of operational input buttons such as an alphanumeric keypad and the like. The operational input unit 115 also includes an interface circuit for recognizing inputs after the buttons have been pressed and outputting the inputs to the CPU 111. For example, the direction instructional button is provided for instructing the CPU 111 to scroll and display a web page displayed on the display unit 16. The confirmation button is provided for instructing the CPU 111 to select one of a plurality of hyperlinks or menus displayed on a web page. The selected hyperlink or menu may be activated (e.g., highlighted) when, for example, a plurality of hyperlinks or menus are displayed on the web page. In the case in which the mobile terminal 10 is a small portable terminal, the aforementioned buttons are preferably disposed on the front face of the mobile terminal 10 to allow a user to easily operate (click) the buttons with the thumb of the hand holding the mobile terminal 10. In the example illustrated in FIG. 2A, the button group 115b is arranged below the button group 15a and includes a plurality of operational input buttons depicted as "0" to "9", "*", "#" (an alphanumeric keypad).

In the case in which the mobile terminal 10 is a communication terminal to which a touch panel input method (see FIG. 2B) applies, the operational input unit 115 receives touch panel method inputs inputted by mainly touching the display screen 16a with a finger or a pen. The touch panel input method may be a known method such as a capacitance method. As illustrated in FIG. 2B, the mobile terminal 10 may be provided with a button group 15a despite having the touch panel input method.

The operational input unit 115 may be equipped with a three axis accelerometer so that a direction and intensity of a swinging action is detected.

In the case in which a button input method applies to the mobile terminal 10 for example, a selection operation of a menu on a web page displayed on the mobile terminal 10 is performed by the following steps: selecting a menu with a pressing operation of the direction instructional button and subsequently confirming the selected menu with a pressing operation of the confirmation button. In the case in which a touch panel input method applies to the mobile terminal 10 for example, the selection operation is conducted by indicating (touch operation) with a finger or pen a position of a menu on the display screen 116a on which the web page is displayed.

Configuration of the PC 12 can be the same as that of the mobile terminal 10 as illustrated in FIG. 3, and the configuration is therefore omitted for the sake of brevity. In the case of the PC 12, the operational input unit may be comprised of an input hardware such as a keyboard or a mouse and the like.

It should be noted that, the both of the mobile terminal 10 and the PC 12 are communicated with the game server 20 through the communication interface unit according to the any known wireless or wired communication protocol.

(1-3) Game Server Configuration

Figure 4:
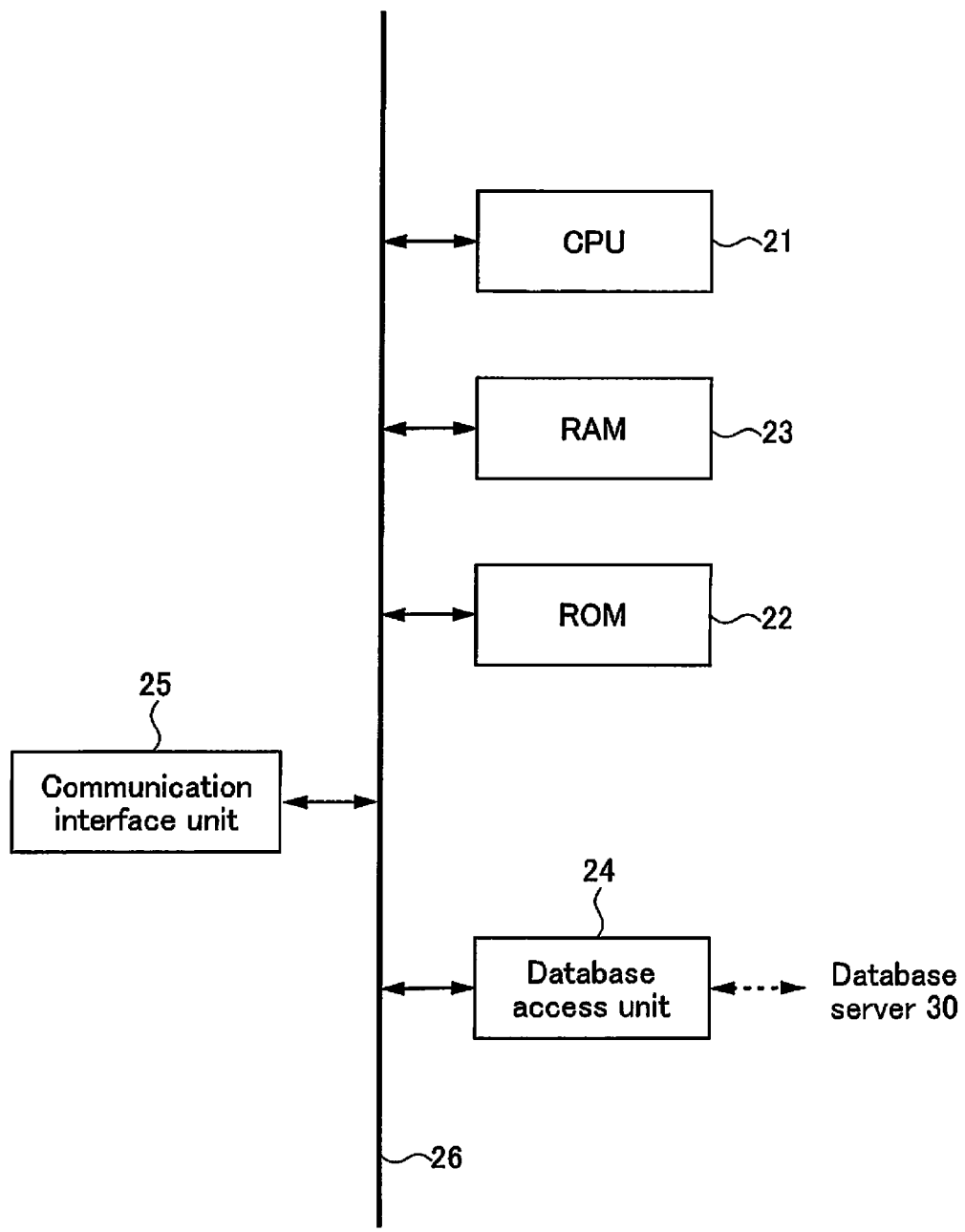
FIG. 4 illustrates a configuration of a game server according to the first embodiment.

The structure of the game server 20 will be explained with reference to FIG. 4.

For example, the game server 20 manages a website of a game including a plurality of hierarchically structured web pages. The game server 20 provides the mobile terminal 10 and PCs 12 with web service of a game. As illustrated in FIG. 4, the game server 20 includes a CPU 21, a ROM 22, a RAM 23, a database (DB) access unit 24, and a communication interface unit 25. Further, the game server 20 includes a bus 26 for transmitting control signals or data signals between the components. It should be noted that the game server 20 may have the same hardware structure as general-purpose web servers.

The ROM 22 stores an application program that provides service of displaying a HTML document and objects such as images (i.e., displaying a web page) to the web browser of the mobile terminal 10 as a client. A variety of data referenceable by the CPU 21 is stored in the ROM 22 in addition to the application program.

The CPU 21 loads a game program stored in the ROM 22 into the RAM 23 and runs the loaded game program. The CPU 21 also performs a variety of processing through the communication interface unit 25.

For example, the CPU 21 transmits HTML data to the mobile terminal 10 and/or the PC 12 through the communication interface unit 25. Moreover, the CPU 21 performs authentication processing in the case in which the game server 20 performs authentication processing of the user of the mobile terminal 10 and/or the PC 12.

The CPU 21 performs processing in accordance with the hyperlink or menu selected by the user on the web page displayed on the mobile terminal 10 through the communication interface unit 25. The processing includes, for example, transmitting new HTML data, calculating or data processing in the game server 20.

The database access unit 24 is an interface used for the CPU 21 to perform data reading and data writing with respect to the database server 30.

(1-4) Database Server Configuration

The database server 30 can be realized by a general-purpose storage such as a high-capacity hard disc drive, a redundant array of inexpensive disks (RAID) or other form of device. Databases inside the database server 30 are configured to allow reading and writing of data by the CPU 21 through the database access unit 24 of the game server 20.

Figure 5:
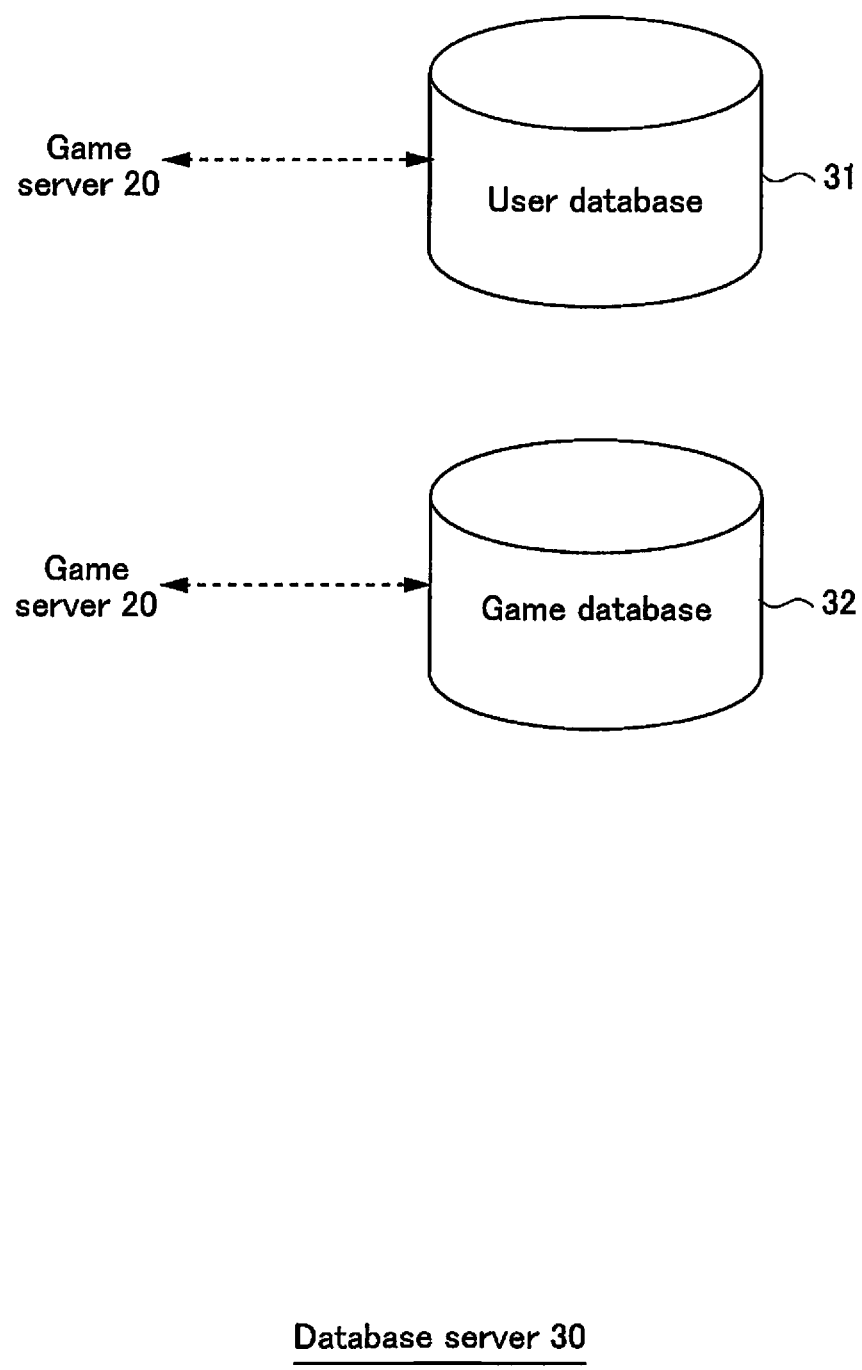
FIG. 5 is a block diagram of a configuration of a database server according to the first embodiment.

FIG. 5 illustrates an example of a database server 30 configuration. As illustrated in FIG. 5, the database server 30 includes a user database 31 and a game database 32.

FIG. 6 depicts an example of the user database 31. User data is referred to as collective data including the following information.

User ID and Password

User ID and Password are set in user registration and are recorded by the game server 20. User ID and Password are data mainly for user authentication that is executed after the PC 12 of a user accesses to the game server 20.

Identification Information

Identification information is unique information for each mobile terminal 10. Identification information is used mainly for user authentication that is executed after the mobile terminal 10 of a user accesses to the game server 20. Identification information may be a serial number of the mobile terminal. Identification information may be a part of a user agent character string in a HTTP request transmitted from the mobile terminal 10 to the game server 20.

After the HTTP request is first transmitted from the mobile terminal 10 to the game server 20, the identification information of the mobile terminal 10 is incorporated into the user agent character string in the HTTP request upon the user's permission. After the identification information of the mobile terminal 10 is first received by the game server 20, the identification information is recorded in association with user ID for the purpose of the subsequent user authentication.

Note that, in the case in which both the main-terminal and the sub-terminal are mobile terminals in executing the game provided by the game server 20, the identification information of those two mobile terminals are recorded.

Terminal Information of Main-Terminal

Terminal information of main-terminal is information of the communication terminal identified as main-terminal among a plurality of communication terminals when the game server 20 is accessed from the plurality of communication terminals of the user to be processed. The terminal information of the communication terminal may be any information that identifies the communication terminal such as address information like IP address, etc. Note that, as described later, a method to identify a main-terminal or a sub-terminal may be as follows. For example, the user agent character string in a HTTP request, which is transmitted from the communication terminal to the game server 20, includes information about an operating system and a web browser. For example, in the case in which there are accesses from a user through both a mobile terminal and a PC, because operating systems installed into the mobile terminal and the PC are different, it is possible to identify whether the communication terminal performing each access is the mobile terminal or the PC. In such case, the PC may be identified as a main-terminal, while the mobile terminal may be identified as a sub-terminal.

Terminal Information of a Sub-Terminal

Terminal information of a sub-terminal is information of the communication terminal identified as a sub-terminal among a plurality of communication terminals after the game server 20 is accessed from the plurality of communication terminals of the user to be processed. The terminal information of the communication terminal may be any information that identifies the communication terminal such as address information like IP address, etc.

(1-5) Example of a Game Provided by the Game Server

Figure 7:
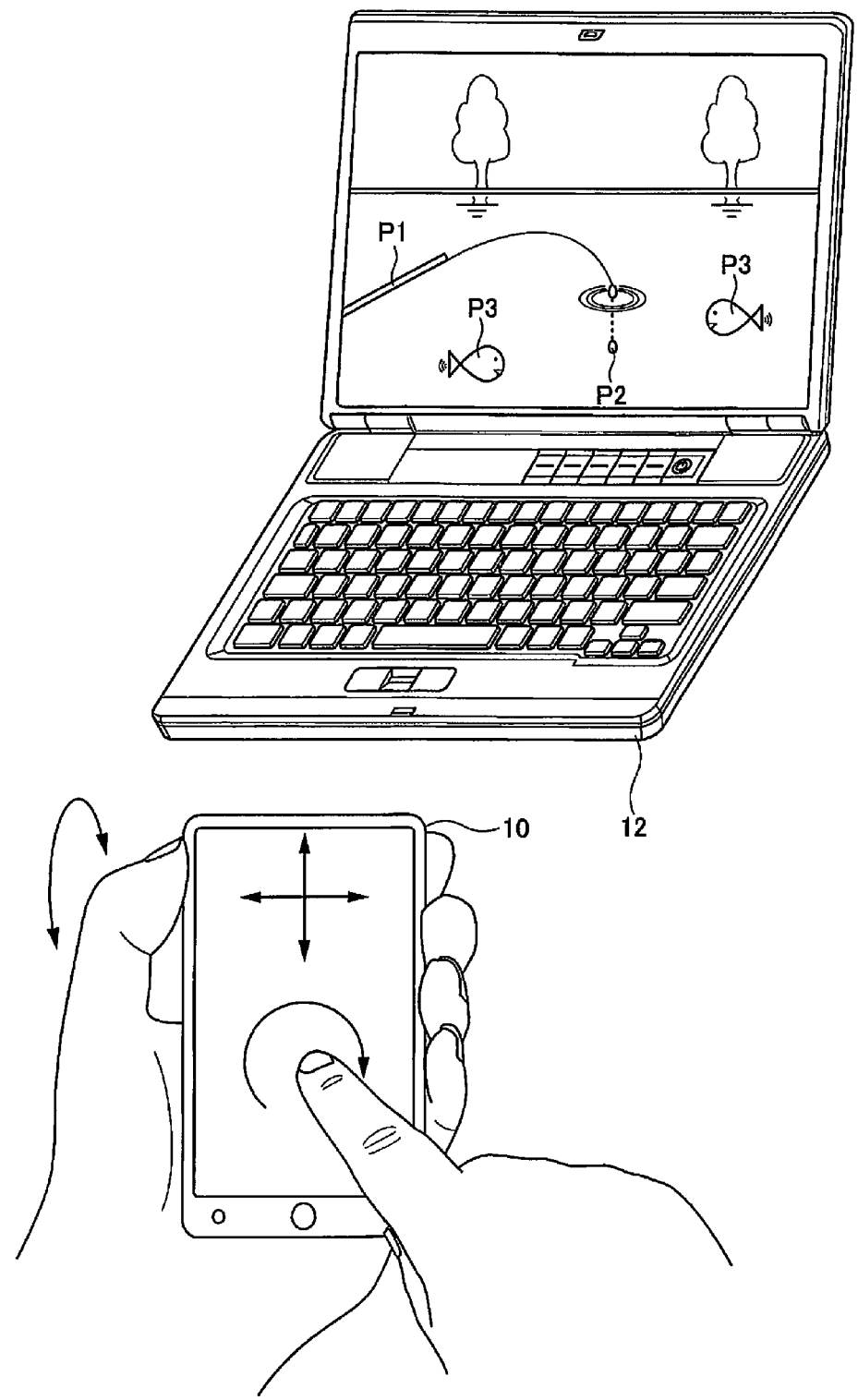
FIG. 7 illustrates a situation in which a user plays a fishing game, which is an example of a motion sensing game, by use of the user's mobile terminal and user's personal computer.
Figure 8:
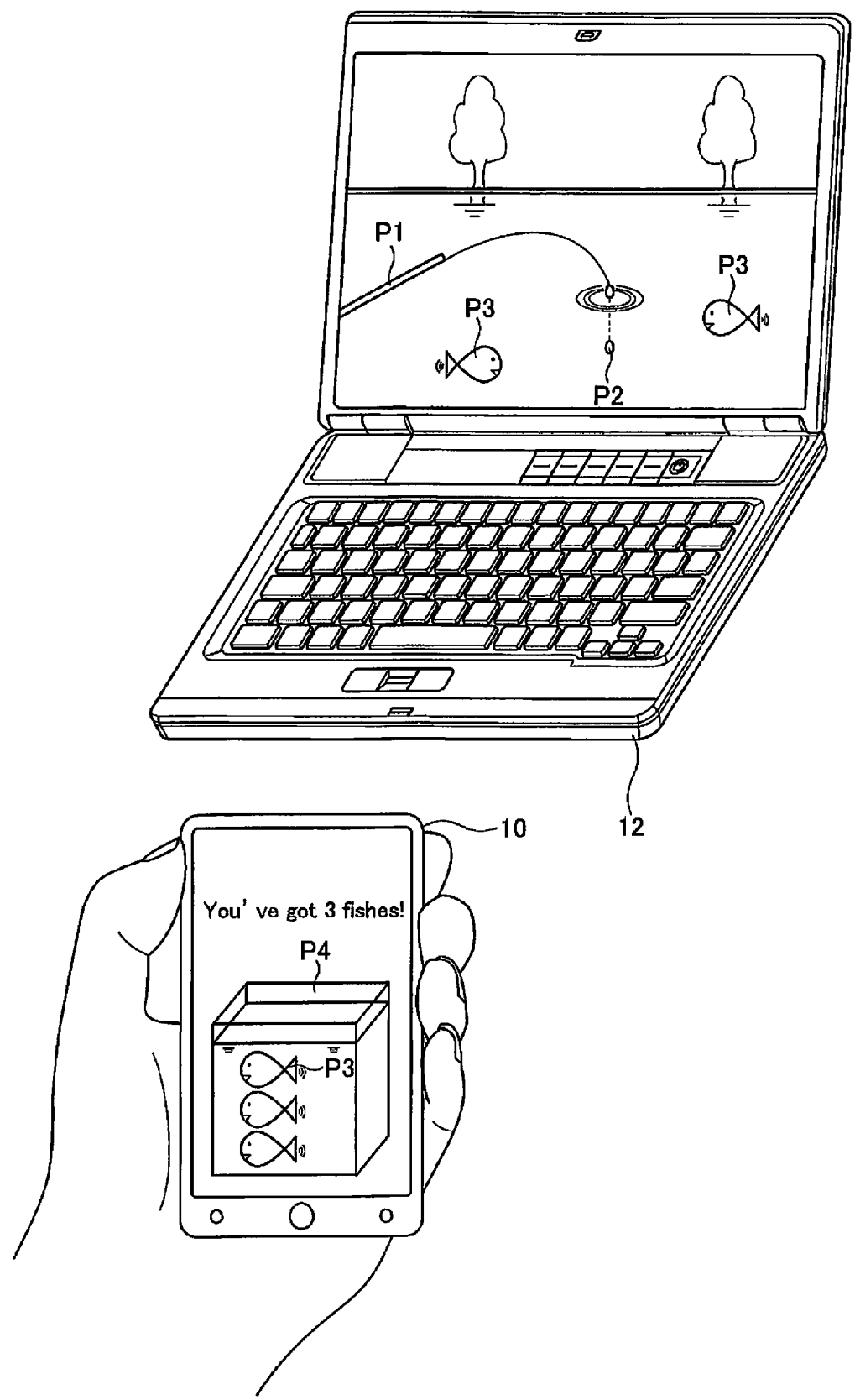
FIG. 8 illustrates an image regarding the fishing game displayed on the mobile terminal.
Figure 9:
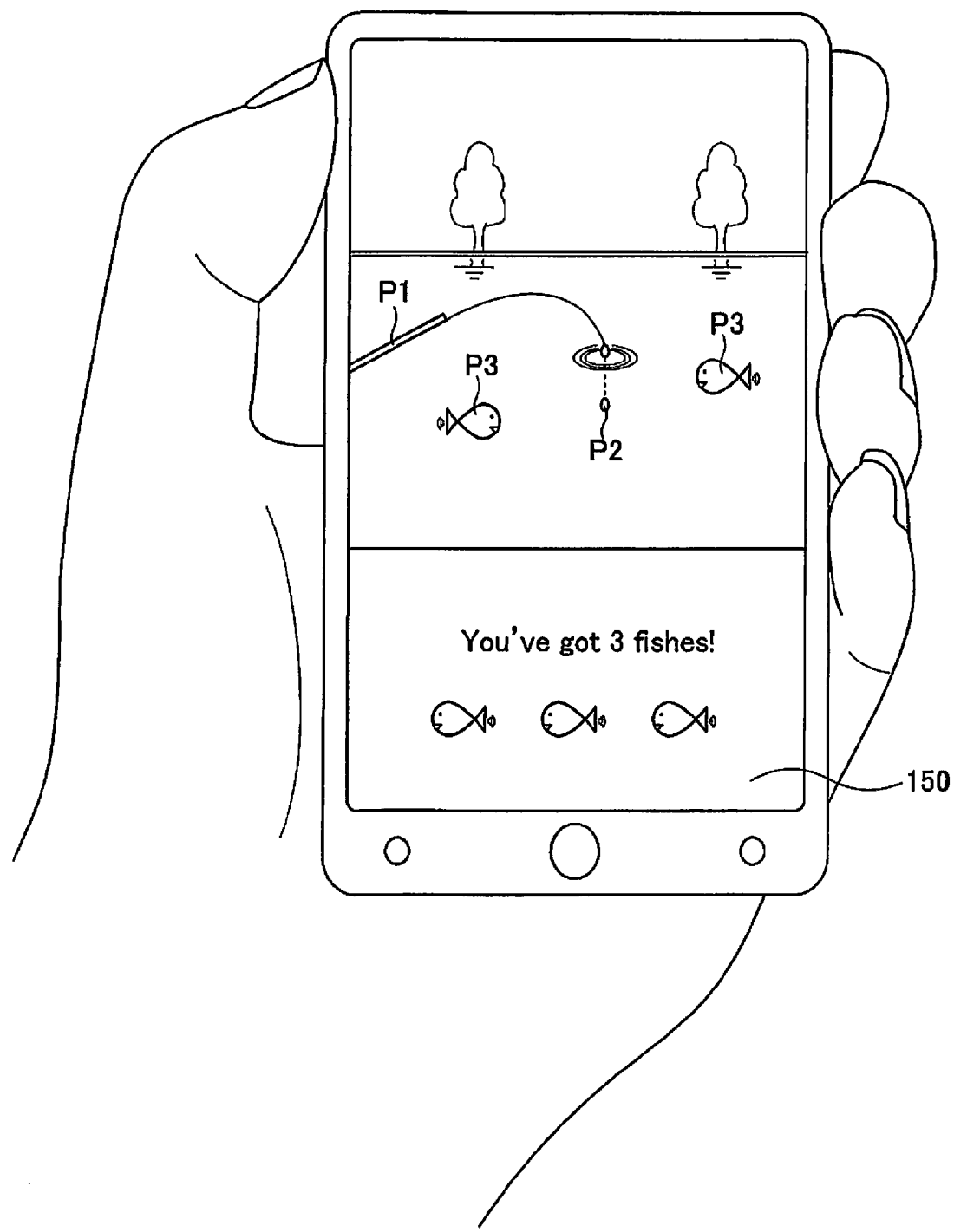
FIG. 9 illustrates a situation in which a user plays the fishing game with the mobile terminal only.

An example of a game provided by the game server will be explained with reference to FIGS. 7 to 9. FIG. 7 illustrates a situation in which a user plays a fishing game, which is an example of a motion sensing game, by use of the user's mobile terminal 10 and user's PC 12. FIG. 8 illustrates an image regarding the fishing game displayed on the mobile terminal 10. FIG. 9 illustrates a situation in which a user plays the fishing game with the mobile terminal 10 only.

In FIG. 7, a game image of the fishing game being executed is displayed on the PC 12 in response to a user operation to the mobile terminal 10 as sub-terminal. The game image that is displayed on the display unit of the PC 12 includes a fishing rod object P1, a bait object P2, and fish objects P3 that move in a pond which is a background image, for example.

This fishing game is configured such that, the fish objects P3 randomly move on the game image, and after reaching the bait object P2 at the edge of the fishing rod object P1, the fish object P3 stops moving for a certain period of time.

The user performs casting with regard to the fishing rod object P1 in the fishing game by swinging the mobile terminal 10. Depending on intensity and a direction (namely, output value of the accelerometer in the operational input unit 115) of the swinging action with respect to the mobile terminal 10, a position is determined where the bait object P2 is landed on the water by the casting. In the case in which a touch panel input method applies to the mobile terminal 10 as illustrated in FIG. 7, a reel of the fishing rod object P1 is wound up in response to a user's moving operation with a finger of the user rotating on a display screen. In this fishing game, it is judged that the fish object P3 has been caught, if the user performs an operation with which the reel of the fishing rod object P1 is wound up while the fish object P3 stops moving at the position of the bait object P2 for a certain period of time. Further, in the case in which a touch panel input method applies to the mobile terminal 10 as illustrated in FIG. 7, the bait object P2 for example may be selectable on the screen of the mobile terminal 10, in response to moving operations with regard to the display screen with a finger of the user in the forward, backward, right, or left direction (not illustrated in FIG. 7).

As illustrated in FIG. 8, based on the game progression status, the mobile terminal 10 as sub-terminal may be configured to display an image including a fish tank object P4. The fish tank object P4 contains the fish objects P3 which is judged to have been caught, thereby allowing to visually recognize catches in fishing. In this case, the fishing game progresses with two screens. An image that is displayed on the mobile terminal 10 is updated every time it is judged that a fish object P3 has been caught. That is, images displayed on the PC 12 and the mobile terminal 10 may be updated such that, if it is judged that a specific fish object P3 has been caught, then the fish object P3 disappears from the pond, and the fish object P3 is added into the fish tank object P4.

As exemplified in FIG. 9, in the case in which the user plays the fishing game by use of mobile terminal 10 only, a single image including game contents of two images illustrated in FIG. 8 may be displayed on the mobile terminal 10. In this case, the fishing game progresses with a single screen. In the example of FIG. 9, a display region 150 is provided on the display screen of the mobile terminal 10 to indicate catches in fishing.

FIG. 7 indicates, but not limited to, an exemplary case in which a touch panel input method applies to the mobile terminal 10 as sub-terminal. In the case in which a button input method applies to the mobile terminal 10, the moving operation with a finger of the user rotating on the display screen may be allocated to a pressing input of any button of the plurality of buttons equipped for the mobile terminal 10. Further, the moving operation with a finger of the user in the forward, backward, right, or left direction on the display screen, may be each allocated to a pressing input of any button of the plurality of buttons equipped for the mobile terminal 10.

It should be noted that the fishing game is exemplified as a game provided by the game server 20 for convenience of explanation; however, a game provided from the game server 20 is not limited to a specific type of game. Any game that is realized using a main-terminal and a sub-terminal may be applied.

(1-6) Overview of Functions of Game Control Device

Figure 10:
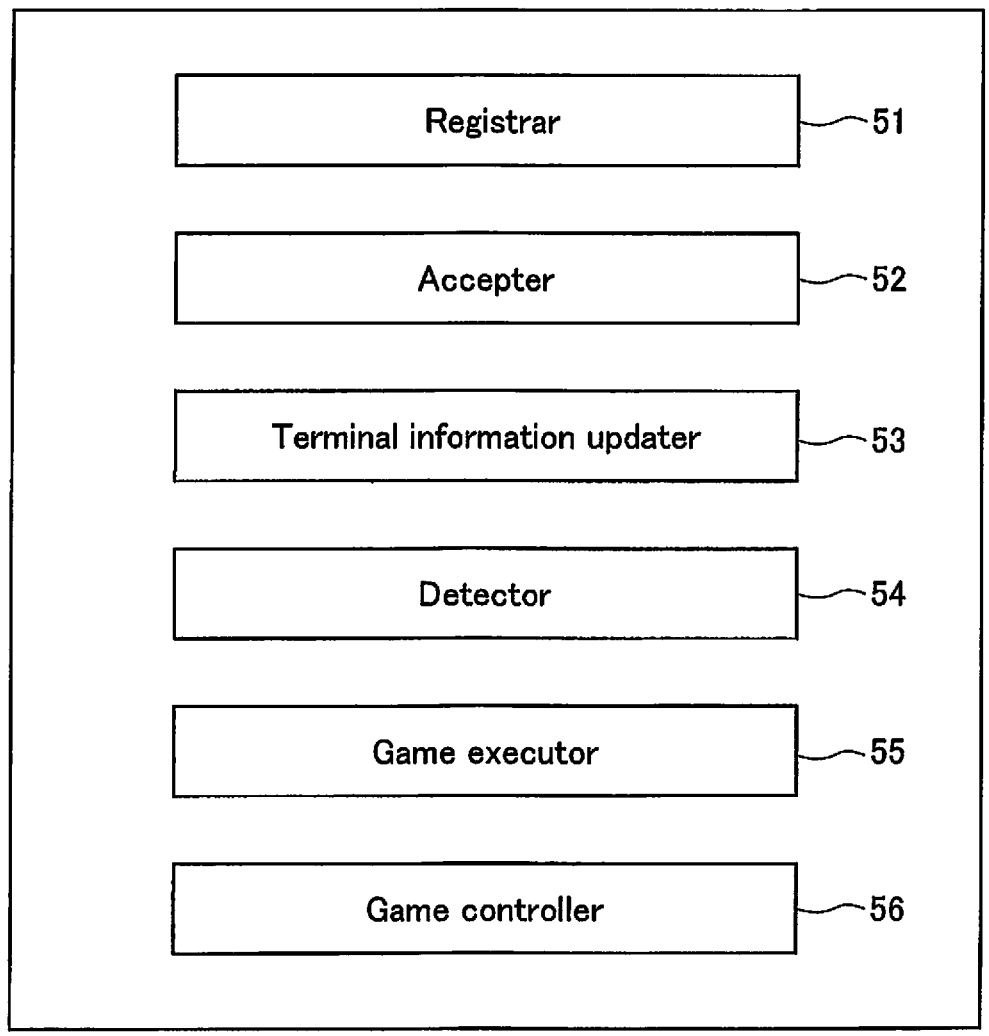
FIG. 10 is a functional block diagram for explaining functions that play main rolls in the game control device according to the first embodiment.

In the present embodiment, the game control device is configured, for example, by the game server 20 and the database server 30. Hereinafter, functions realized by the game control device of the present embodiment will be described with reference to FIG. 10 in the exemplified case in which the fishing game described above is applied. FIG. 10 is a functional block diagram for explaining functions that play main rolls in the game control device according to the present embodiment.

A registrar 51 includes a function for recognizing a user request and executing registration processing. Such request is based on a suitable operational input to the mobile terminal 10 or PC 12 on a web page provided to the mobile terminal 10 or PC 12, for example. The function of the registrar 51 is realized, for example, as described below.

The CPU 21 of the game server 20 receives a registration request message (HTTP request) from the mobile terminal 10 or the PC 12 through the communication interface unit 25. In the case in which the CPU 21 receives the HTTP request from the mobile terminal 10, the received HTTP request includes user agent character strings containing identification information which is a serial number of the mobile terminal 10, for example. After first receiving the identification information, the CPU 21 records the identification information in the user database 31 in association with user ID for the purpose of subsequent user authentication.

The HTTP request that the CPU 21 receives from the PC 12 includes a user ID and a password specified by the user based on operational inputs to the PC 12. That is, the HTTP request is generated in the PC 12 so as to include input result of the user ID and the password. The HTTP request is then transmitted to the game server 20. After receiving the user ID and the password, the CPU 21 correlates the user ID and the password and records them in the user database 31 for the purpose of subsequent user authentication. On the other hand, the CPU 21 of the game server 20 receives a registration request message (HTTP request), and issues a new user ID and a new password if any user ID is not included in the registration request message. The CPU 21 records the newly issued user ID and password in the user database 31 for the purpose of subsequent user authentication.

The web page provided by the game server 20 may be configured so that a registration request message is automatically generated by a certain operation (e.g., a selection of a certain menu, or a text input and the like) on the mobile terminal 10 or the PC 12 on the web page. Information (e.g., an IP address or an email address and the like) for identifying the mobile terminal 10 or the PC 12 that is the transmission source may be included in the registration request message. Alternatively, in the case in which the user plays the other game(s) from the same service provider, the registration request message may include the user ID of that user.

After a user ID, a password and/or identification information of the mobile terminal 10 are recorded in the user database 31, the registration processing completes. The CPU 21 transmits a registration completion message to the mobile terminal 10 indicating that the registration processing has completed.

The accepter 52 includes a function for accepting an access request including identification information from the mobile terminal 10, and also includes a function for accepting an access request including a user ID from PC 12. The functions of the accepter 52 are realized as described below. After receiving a HTTP request as access request from the mobile terminal 10 or the PC 12 of the user, the CPU 21 of the game server 20 identifies identification information, or user ID and a password, based on user agent character strings included in the HTTP request. The CPU 21 collates the identified identification information, or the identified user ID and the identified password, with the identification information, or the user ID and the password recorded in the user data of the user database 31. If the received access request is one from any of the registered users, the CPU 21 accepts the access request.

The terminal information updater 53 includes a function for recording and updating terminal information of a single or a plurality of communication terminal(s) of the user(s) whose access request has been accepted. Terminal information of a communication terminal is information capable of identifying the communication terminal, like address information such as IP address, etc. The terminal information updater 53 further includes a function for identifying a main-terminal and a sub-terminal among the single or the plurality of communication terminal(s) of the user(s) whose access request has been accepted, before the terminal information is updated.

The function of the terminal information updater 53 is realized as described below. Based on information regarding an operating system of a transmission source communication terminal for example, the CPU 21 of the game server 20 specifies the communication terminal as the mobile terminal 10 or the PC 12. Alternatively, if a HTTP request includes identification information, the CPU 21 may then determine that the transmission source communication terminal is the mobile terminal 10. Meanwhile, if the HTTP request includes a user ID and a password, the CPU 21 may then determine that the transmission source communication terminal is the PC 12. Resultantly, in the case in which the CPU 21 receives accesses that are associated with identical user identification information from two communication terminals for example, the CPU 21 executes the following processing. That is, if one of the two communication terminals is identified as the PC 12 and other communication terminal is identified as the mobile terminal 10, then the CPU 21 identifies the PC 12 as a main-terminal and identifies the mobile terminal 10 as a sub-terminal. In the case in which an access is received from a single communication terminal, the CPU 21 identifies the communication terminal (either the mobile terminal 10 or the PC 12, for example) as both main-terminal and sub-terminal. After identifying a main-terminal and a sub-terminal, the CPU 21 writes terminal information of the identified communication terminal into the user database 31 in association with the user ID.

A main-terminal and a sub-terminal in executing the game provided by the game server 20 may be each a mobile terminal among a plurality of communication terminals of a user. In such case, the CPU 21 identifies any of mobile terminals as main-terminal based on an appropriate input operation to any of the mobile terminals.

A mobile terminal and a PC are exemplified as a plurality of communication terminals in the present embodiment. In such case, preferably, the PC, which is generally equipped with a larger display screen than the mobile terminal, is identified as main-terminal, while the mobile terminal, which is held by a user's hand, is identified as sub-terminal. A method for identifying a main-terminal and a sub-terminal is not limited to one described above. Such method may be predetermined according to a certain rule, depending on a type or a character of a communication terminal performing an access. Alternatively, identifying a main-terminal and a sub-terminal among a plurality of communication terminals may be performed based on an operational input to a communication terminal. In such case, the CPU 21 recognizes the operational input to set or exchange a main-terminal and a sub-terminal.

It should be noted that a communication terminal used for an access to the game server 20 may be changed with regard to a specific user. The terminal information updater 53 identifies a main-terminal and a sub-terminal every time a communication terminal in use is changed, and rewrites data in the user database 31. For example, in the case in which a user first accesses through the mobile terminal 10 only, the mobile terminal 10 is identified as both a main-terminal and a sub-terminal. Then, the same information regarding the mobile terminal 10 is written into each field of "Terminal information of main-terminal" and "Terminal information of sub-terminal" in the user database 31. Thereafter, in the case in which the user accesses through the PC 12 additionally, the PC 12 is identified as main-terminal while the mobile terminal is identified as sub-terminal. Then, the fields of "Terminal information of main-terminal" and "Terminal information of sub-terminal" are modified in the user database 31.

The detector 54 includes a function for detecting accesses from a plurality of communication terminals that are associated with an identical user ID.

The function of the detector 54 is realized as described below. The CPU 21 of the game server 20 refers to the user database 31 to compare terminal information of the main-terminal and terminal information of the sub-terminal. If the terminal information of the main-terminal and the terminal information of the sub-terminal are identical, then it is judged that there is an access from a single communication terminal. On the other hand, if the terminal information of the main-terminal and the terminal information of the sub-terminal are not identical, then it is judged that there are accesses from at least two communication terminals that are associated with an identical user ID.

The game executor 55 includes a function for executing a game for a user of a user ID after access from a communication terminal based on the user ID.

The function of the game executor 55 is realized as described below. After there is an access from communication terminal (s) (namely, the mobile terminal 10 and/or the PC 12), the CPU 21 of the game server 20 transmits HTML data (game data) to that communication terminal. The transmitted HTML data is for displaying a web page including a start button of the fishing game. After receiving a HTTP request including a game start request of the fishing game in response to an operation of a user to the communication terminal, the CPU 21 starts executing the fishing game for the user thorough web pages. The fishing game is executed in the following. That is, the CPU 21 recognizes respective operational inputs of the user to the communication terminal(s) (namely, the mobile terminal 10 and/or the PC 12). The CPU 21 executes a program in response to the operational inputs. Then, the CPU 21 transmits HTML data displaying web pages including execution results to the communication terminal(s) of the user. Operational inputs and contents to be processed in response to each operational input are written in the program of the fishing game described above.

The game data transmitted to the communication terminal (s) (namely, the mobile terminal 10 and/or the PC 12) is not limited to HTML data, but may be compressed image data of game image to be displayed on the communication terminal(s). In the case in which at least a portion of a program and/or data for progressing the game with the mobile terminal is included, the game data transmitted to the communication terminal (s) may be a command for causing the program run on the communication terminal(s), or a command for extracting data (compressed image data, for example) memorized in the communication terminal(s), etc.

The game controller 56 includes a function for transmitting game data of the game being executed to the PC 12 (second communication terminal) in response to an operational input to the mobile terminal 10 (first communication terminal) in the case in which there are accesses from a plurality of communication terminals that are associated with an identical user ID. The game data may be, for example, HTML data as described above.

The function of the game controller 56 may be realized as described below, for example. In the case in which terminal information of the main-terminal and terminal information of the sub-terminal are different for user ID being processed, the CPU 21 of the game server 20 performs the following processing. That is, the CPU 21 generates HTML data (game data of the game being executed) based on information of an operational input included in a HTTP request received from the sub-terminal. The generated HTML data includes execution result of the program of the fishing game in response to the operational input. The CPU 21 then transmits the HTML data to the main terminal (PC 12 in FIG. 7). Further, as illustrated in FIG. 8, in the case in which the fishing game progresses with two screens, the CPU 21 also transmits HTML data to the sub-terminal (mobile terminal 10 in FIG. 8) based on the information of the operational input included in the HTTP request received from the sub-terminal. In this case, the HTML data (second game data) transmitted to the main-terminal and the HTML data (first game data) transmitted to the sub-terminal are different each other.

Note that, in the case in which terminal information of the main-terminal and terminal information of the sub-terminal are the same for user ID to be processed, that is, in the case in which the user accesses through a single communication terminal, the CPU 21 may transmit HTML data to the communication terminal (mobile terminal 10, for example). The transmitted HTML data is for displaying game image for a single screen, as illustrated in FIG. 9.

(1-7) Main Processing Flow of the Game Control Device According to the Present Embodiment Next, an example of main processing flow of the game control device according to the present embodiment will be explained with reference to flowcharts of FIGS. 11 and 12. Processing of FIGS. 11 and 12 is performed for every user ID.

Figure 11:
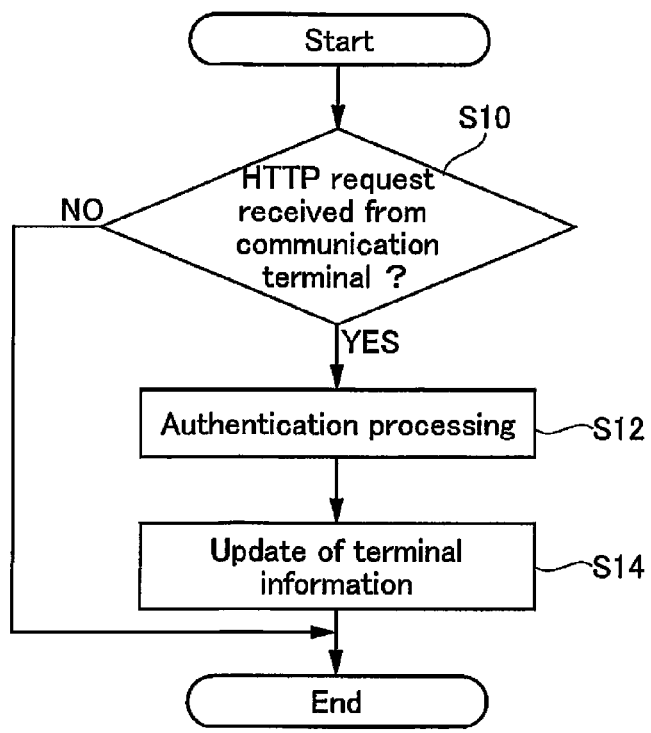
FIG. 11 is a flowchart indicating main processing performed by the game control device according to the first embodiment.
Figure 12:
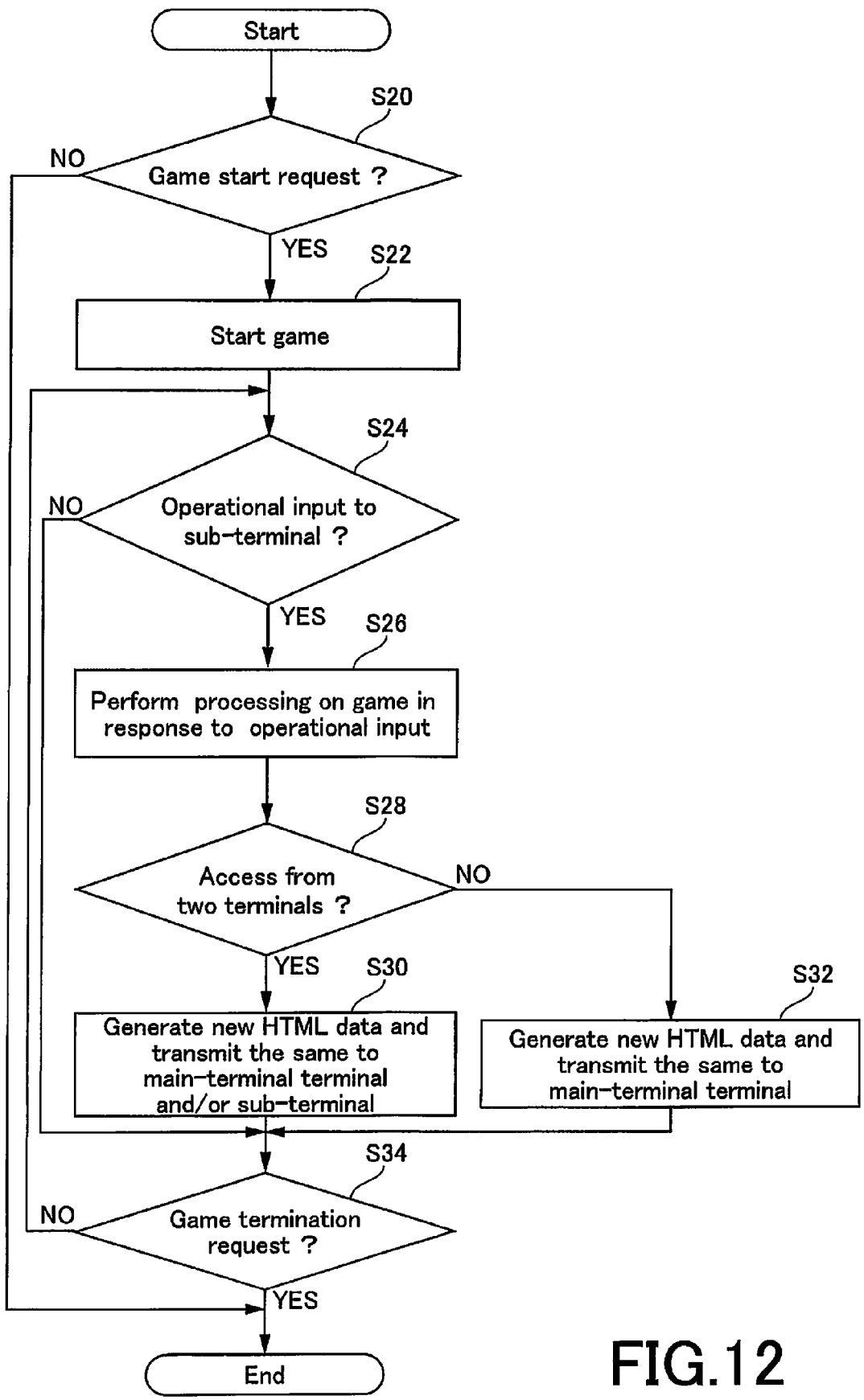
FIG. 12 is a flowchart indicating main processing performed by the game control device according to the first embodiment.

The flowchart of FIG. 11 represents processing after a registered user (that is, a user whose user ID is registered) logins to the game server 20. In this case, in response to an operational input by the user to communication terminal (mobile terminal 10 or PC 12), a HTTP request (access request) is transmitted from the mobile terminal 10 or the PC 12 to the game server 20. The HTTP request transmitted from the mobile terminal 10 includes identification information. The HTTP request transmitted from the PC 12 includes a user ID and a password that have been inputted to the PC 12. After receiving the HTTP request (Step S10: YES), the game server 20 performs authentication processing (Step S12). In the authentication processing, the identification information, or the user ID and the password, which are included in the HTTP request, are identified first. The game server 20 then collates the identified identification information, or the identified user ID and the identified password, with the identification information, or the user ID and the password recorded in the user data of the user database 31. If the received access request is a request from any of the registered users, the game server 20 accepts the access request.

After receiving an access request based on a user ID, the game server 20 accesses to the user database 31 to record and update terminal information of the communication terminal in association with the user ID (Step S14). In updating the terminal information, the game server 20 identifies a main-terminal and a sub-terminal of the user whose access request has been accepted.

In order to identify a main-terminal and a sub-terminal of the user, the game server 20 first identifies a transmission source communication terminal from the mobile terminal 10 and the PC 12 based on information regarding an operating system of the transmission source communication terminal. The game server 20 may identify the transmission source communication terminal as main-terminal or sub-terminal, on the basis of whether authentication processing is performed based on identification information, or on a user ID and a password. If the game server 20 has already received an access from one of the mobile terminal 10 and the PC 12 that are associated with an identical user ID, and receives an access from another of the mobile terminal 10 and the PC 12 at Step S10, then the game server 20 identifies the PC 12 as main-terminal and identifies the mobile terminal 10 as sub-terminal. If the game server 20 has not received an access from any one of the mobile terminal 10 and the PC 12 that are associated with an identical user ID, and receives an access from the mobile terminal 10 or the PC 12 at Step S10, then the game server 20 identifies the communication terminal (mobile terminal 10 or PC 12) from which access is received, as both main-terminal and sub-terminal. After identifying the main-terminal and the sub-terminal, the game server 20 writes terminal information of the identified communication terminal into the user database 31.

The flowchart of FIG. 12 represents processing during a period of time in which the user plays the game. In the explanation below, a case is assumed in which the PC 12 is identified as main-terminal while the mobile terminal 10 is identified as sub-terminal in the case in which there are accesses from a user to be processed from two communication terminals. It is also assumed that the mobile terminal 10 is identified as both main-terminal and sub-terminal in the case in which there is an access from a user to be processed from a single communication terminal.

An access is received to the game server 20 (that is, a user logins). Then, the game server 20 transmits HTML data (game data) to any one of the use's communication terminals (preferably, to the mobile terminal 10, if that an access is received from a plurality of communication terminals of the user). The transmitted HTML data is for displaying a web page including a start menu of the fishing game. A HTTP request including a game start request of the fishing game is transmitted to the game server 20, in response to a selection operation for a given menu in the web page displayed on the communication terminal (Step S20). After receiving the HTTP request including the game start request of the fishing game, the game server 20 starts game processing for the user of the transmission source communication terminal of the request (Step S22).

The game processing is started. Then, after recognizing an operational input to the mobile terminal 10 as sub-terminal (Step S24: YES), the game server 20 performs predetermined processing according to the game program of the fishing game (Step S26). A method for displaying results of execution of the program varies depending on whether the game server 20 is accessed from two communication terminals of the user or is accessed from a single communication terminal of the user. Note that the game server 20 judges whether the game server 20 is accessed from two communication terminals of a user or is from a single communication terminal of a user, with reference to the terminal information of the main-terminal and the terminal information of the sub-terminal in the user database 31.

If the game server 20 is accessed from two communication terminals of a user (Step S28: YES), then it generates HTML data (new HTML data) for displaying a new web page based on the results of execution of the program. The game server 20 then transmits the HTML data to the PC 12 as main-terminal. Alternatively, as illustrated in FIG. 8, the game server 20 does not only transmit the HTML data to the PC 12, but it also transmits HTML data to the mobile terminal 10 as sub-terminal (Step S30). The transmitted HTML data to the mobile terminal 10 is different from the one transmitted to the PC 12.

Meanwhile, if the game server 20 is accessed from a single communication terminal (mobile terminal 10 in this case) of a user (Step S28: NO), then it generates HTML data (new HTML data) for displaying a new web page based on the results of execution of the program. The game server 20 then transmits the HTML data to the mobile terminal 10 as both main-terminal and sub-terminal (Step S32).

After a HTTP request including a game termination request of the fishing game is transmitted to the game server 20 in response to a selection operation of a menu on the web page (Step S34: YES), the game server 20 terminates the game processing for the user of the transmission source communication terminal of the request.

Note that there is a case in which a user starts the game by accessing first through a single communication terminal (mobile terminal 10, for example) and then accesses through the other communication terminal (PC 12, for example) as well in the middle of the game. In such case, after recognizing that there is an access from the PC 12, the game server 20 rewrites the database server 30 such that status in which the mobile terminal 10 is identified as both main-terminal and sub-terminal, is changed to status in which the PC 12 is identified as main-terminal and the mobile terminal 10 as sub-terminal. The game server 20 then switches transmission destination of the HTML data for displaying a new web page from the mobile terminal 10 to the PC 12.

As described above, with the game control system of the present embodiment, in the case in which there are accesses that are associated with an identical user ID from two communication terminals (mobile terminal 10 and PC 12), the game server 20 transmits HTML data (game data) to the PC 12 (second communication terminal) of the two communication terminals, in response to an operational input to the mobile terminal 10 (first communication terminal) of the two communication terminals. The transmitted HTML data is for displaying image of the game being executed. Thus, for example, a user may go out with a mobile terminal only, and the user can enjoy a variety of games that would be difficult to realize with the mobile terminal only, by use of the mobile terminal and a PC existing outside. As illustrated in FIG. 7 for example, the mobile terminal 10 primarily functions as a controller for receiving operational inputs from the user in the game, while the PC 12 primarily functions as display device for displaying a game image, thereby realizing a motion sensing game such as the exemplified fishing game. That is, a user can enjoy irrespective of a place where the user is, without need to bring a large input device. Note that, as illustrated in FIG. 8, an image displayed on the mobile terminal 10 may be configured to be different from that displayed on the PC 12. This allows game entertainment to be enhanced, since information indicating game results for respective users, or items and objects, etc., which the user owns in the game, apart from virtual game space indicating game environment, may be able to be displayed on the mobile terminal 10 which is held by a user's hand.

(2) Second Embodiment

The second embodiment of the game control system according to the present invention will be described hereinafter.

In the game control system of the present embodiment, hardware configurations of the mobile terminal 10, the PC 12, the game server 20, and the database server 30 may be the same as those described in the first embodiment. The game control system of the present embodiment is configured such that a plurality of users are correlated as friend users through predetermined procedures and the friend users can enjoy a game. In this case, the users may compete for a number of fish objects that are taken in a period of time in the game.

(2-1) Overview of Functions of Game Control Device

Figure 13:
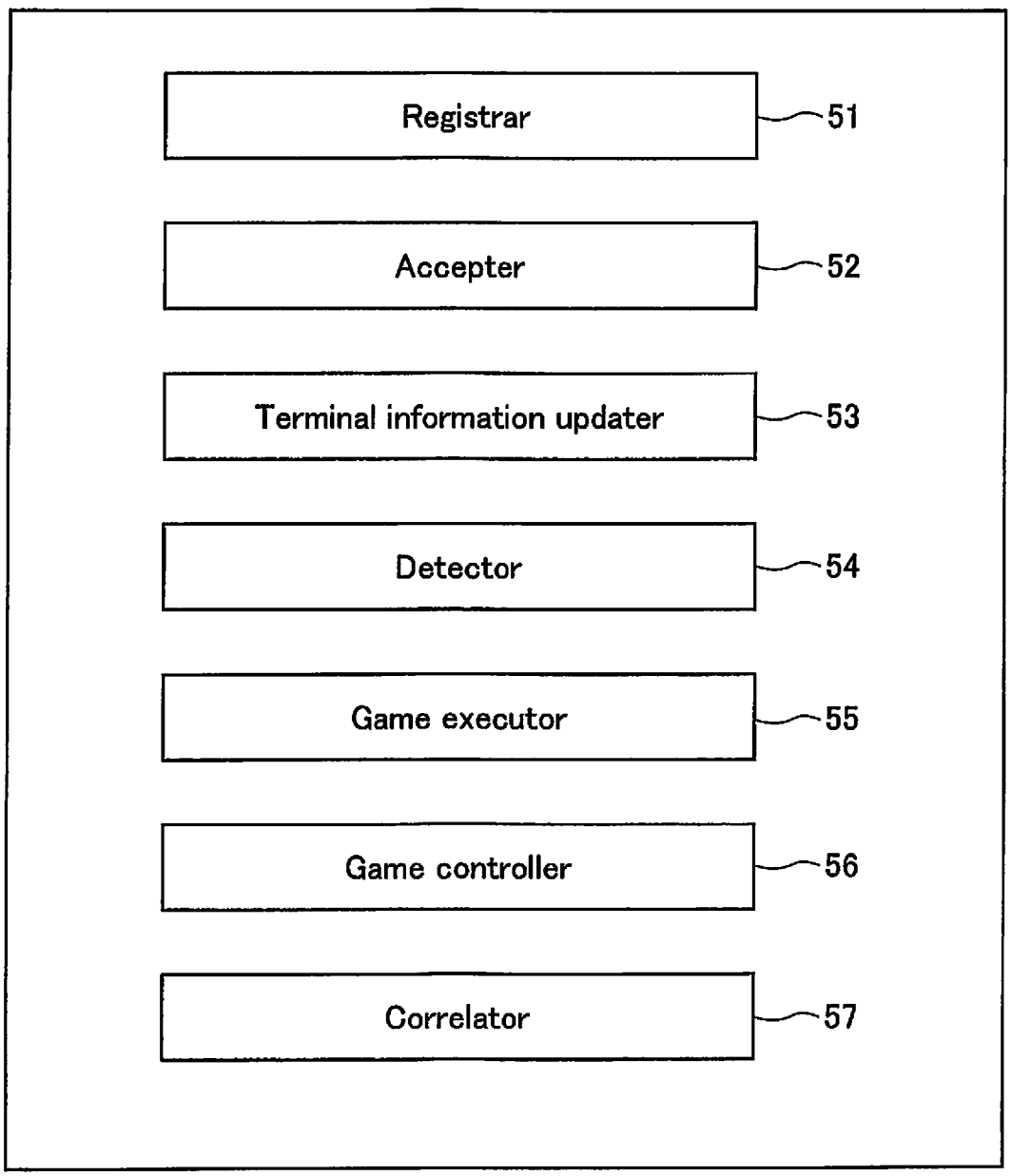
FIG. 13 is a functional block diagram for explaining functions that play main rolls in the game control device according to a second embodiment.

Functions realized by the game control device of the present embodiment will be described hereinafter with reference to FIGS. 13 and 14 in the exemplified case in which the fishing game described above is applied, like the first embodiment. FIG. 13 is a functional block diagram for explaining functions that play main rolls in the game control device according to the present embodiment. The functional block diagram of FIG. 13 is different from that of FIG. 10 in that correlator 57 added. FIG. 14 is an exemplary configuration of a user database 31 according to the present embodiment. In the user database 31 of the present embodiment, information with regard to friend user ID(s) is added for respective user IDs, from the user database 31 of FIG. 6.

The correlator 57 includes a function for correlating at least two different user IDs in the game, in response to a request from a communication terminal performing an access based on any one of a plurality of different user IDs. That is, upon request based on a user ID, the correlator 57 registers the other user ID(s) as friend(s). Note that, in the following explanation, correlation of user IDs as friends is the same as correlation of the corresponding users as friends.

The function of the correlator 57 may be realized as described below, for example. The CPU 21 of the game server 20 receives a request message from a mobile terminal 10 of a user corresponding to a user ID through the communication interface unit 25. The request message specifies a user ID that the user wishes to be a friend with (that is, a user ID that the user wishes to play with). A function of transmission of this request message is prepared as a function of a web page provide to the mobile terminal 10 of the user. After receiving the request message, the CPU 21 transmits HTML data to a mobile terminal corresponding to the user ID that is included in the request message at a time when there is an access based on that user ID. The transmitted HTML data is for displaying a web page for requesting a reply to whether to approve the request from other user ID. If there is a reply to approve the request, the CPU 21 then registers the two user IDs as friends. More specifically, the CPU 21 accesses to user data for the two user IDs in the user database 31, and writes data into the field of "user ID of friends" (see FIG. 14).

In the present embodiment, in addition to the function described in the first embodiment, the game controller 56 includes the following function. In the case in which two user IDs are correlated as friends by the correlator 57, the game controller 56 transmits game data of the game being executed, to a communication terminal performing an access based on one of the two user IDs as friends, in response to an operational input to the communication terminal performing an access based on another of the two user IDs as friends. Before executing the game, or during execution of the game for two users whose user IDs are different, the CPU 21 of the game server 20 recognizes that the two users are friends by referring to the user database 31 and performs the following processing. That is, based on information of an operational input included in a HTTP request which the CPU 21 receives from the sub-terminal of one user ID of two user IDs recognized as friends, the CPU 21 generates HTML data (game data of the game being executed) including results of execution of the fishing game program in response to the operational input. The CPU 21 then transmits the HTML data to either or both of the main-terminals of the two user IDs as friends. In the case in which the HTML data is transmitted to both of the main-terminals of the two user IDs as friends, the respective main-terminals may display different web pages; however, it is preferable that the web pages displayed on the respective main-terminals for the users are related such that the friend users enjoy playing synchronously.

Alternatively, the CPU 21 does not only transmit the HTML data to either or both of the main-terminals of the two user IDs as friends, but the CPU 21 may also transmit HTML data to either or both of the sub-terminals of the two user IDs as friends. The transmitted HTML data to either or both of the sub-terminals may be different from the one transmitted to the main-terminals.

(2-2) Exemplified Gameplay Style 1 in the Case in which Friends Play the Game

Figure 15:
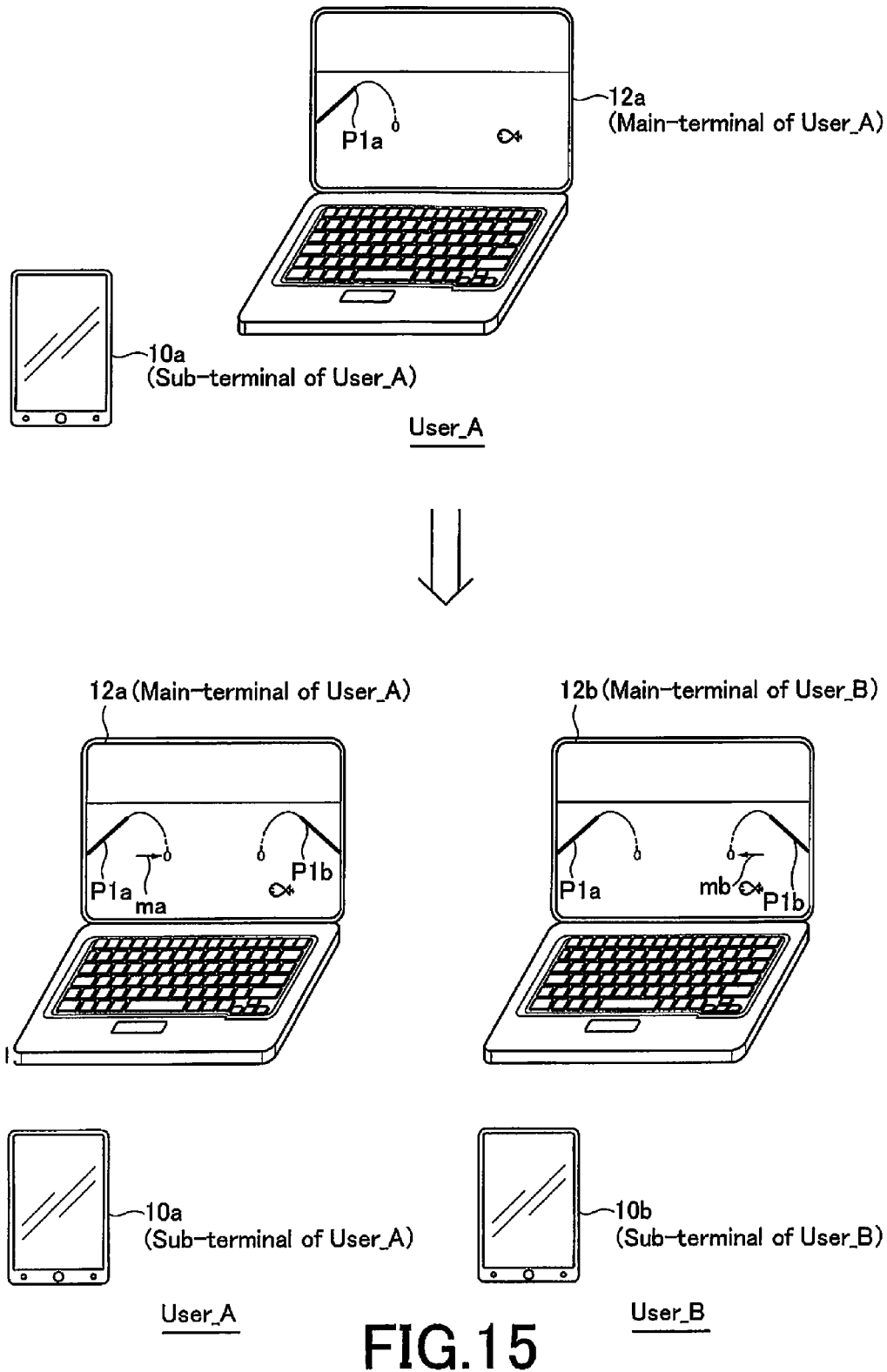
FIG. 15 illustrates conceptually an exemplified gameplay style in the case in which friends play the fishing game together in the second embodiment.

FIG. 15 illustrates conceptually an exemplified gameplay style in the case in which friends play a fishing game together. In this illustrated example, status in which User_A plays the fishing game using a PC 12a as main-terminal and a mobile terminal 10a as sub-terminal, is shifted to status in which User_B, a friend of User_A, participates in the fishing game using a PC 12b as main-terminal and a mobile terminal 10b as sub-terminal (that is, the status in which User_A and User_B play together). In this case, image that represents a common fishing place is displayed on the PC 12a of User_A and the PC 12b of User_B. In this image, a fishing rod object P1a of User_A and a fishing rod object P1b of User_B are distinguishably displayed. In FIG. 15, for example, an arrow mark ma is displayed at the top of the fishing rod object P1a of User_A on the PC 12a of User_A, while an arrow mark mb is displayed at the top of the fishing rod object P1b of User_B on the PC 12b of User_B. This allows respective users to recognize their own fishing rod in the game. The image of FIG. 15 is merely an example. An identical image including respective user names (user name registered in relation to user ID, for example) around respective fishing rod objects, may be displayed on the PC 12a of User_A and the PC 12b of User_B.

Figure 16:
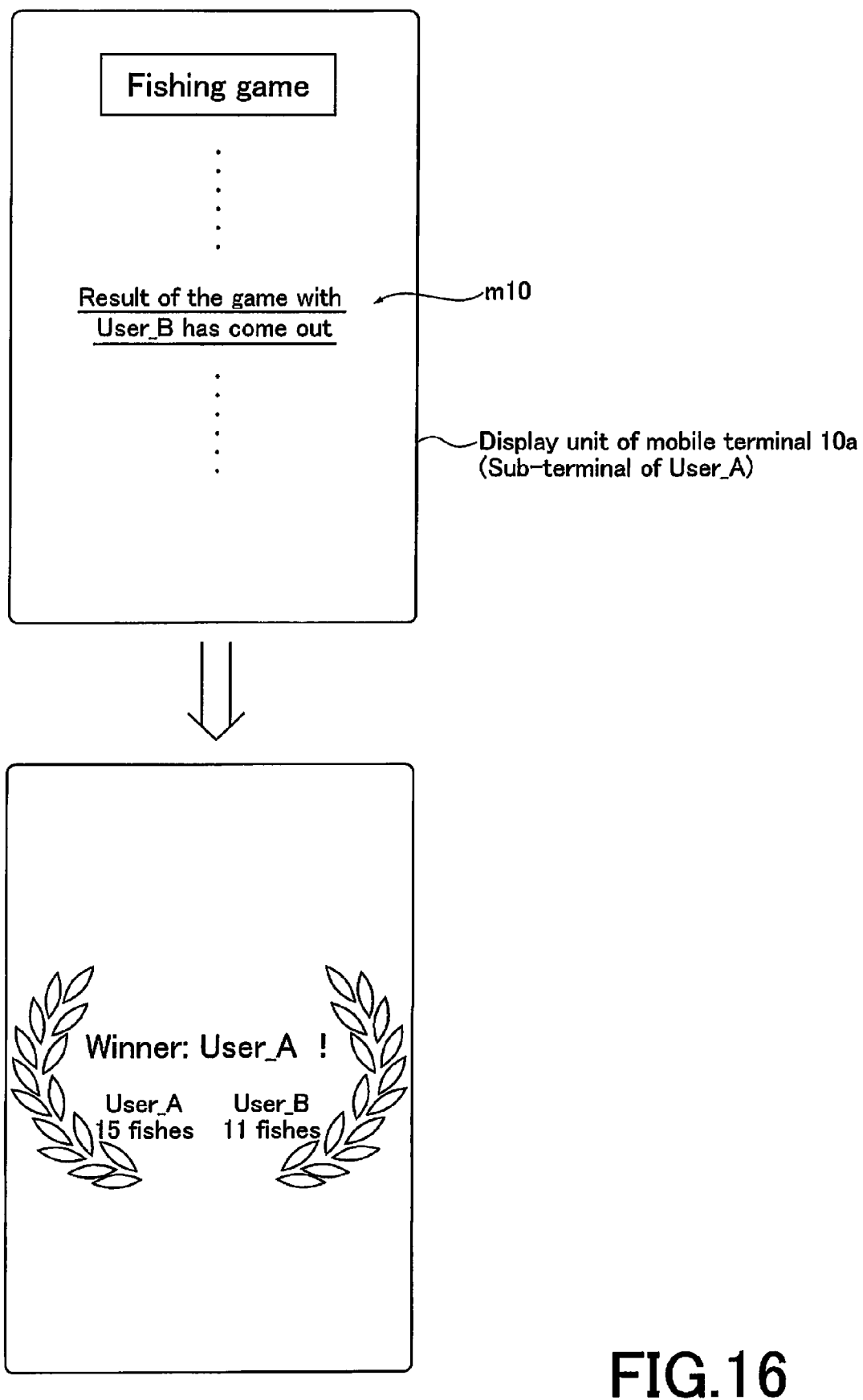
FIG. 16 illustrates an example of screen transition during a period of time in which a user views a result of the fishing game in the second embodiment.

In the gameplay style illustrated in FIG. 15, game specifications may be provided in which User_A and User_B do fishing in a common fishing place to compete for a number of fish that are taken in a period of time, for example. In such case, the game controller 56 may preferably transmit data for viewing a result of the fishing game between User_A and User_B to the communication terminals of User_A and User_B (mobile terminals 10a, 10b as sub-terminals, for example). An example of screen transition is illustrated in FIG. 16. As illustrated in FIG. 16, a menu m10 that includes a text of "Result of the game with User_B has come out." or the like is displayed in a web page of the fishing game provided to the mobile terminal 10a of User_A, after the fishing game between User_A and User_B terminates. Then, in response to a selection operation of User_A to the menu m10, HTML data for displaying a web page including a competition result between User_A and User_B ("Winner: User_A! . . ." in FIG. 16) is transmitted to the mobile terminal 10a of User_A. In this case, after the game between User_A and User_B terminates, the CPU 21 records the game result to the game database 32 and make a content of the menu m10 for example displayed on an updated web page of the fishing game between User_A and User_B. Then, after recognizing that the menu m10, which is displayed on the mobile terminal 10a of User_A, is selected, the CPU 21 refers to the game database 32 to acquire information about the game result between User_A and User_B. The CPU 21 then generates HTML data based on the acquired information.

Next, with reference to a flowchart of FIG. 17, processing will be explained in the case in which the fishing game is performed between friend users as illustrated in FIG. 15.

Figure 17:
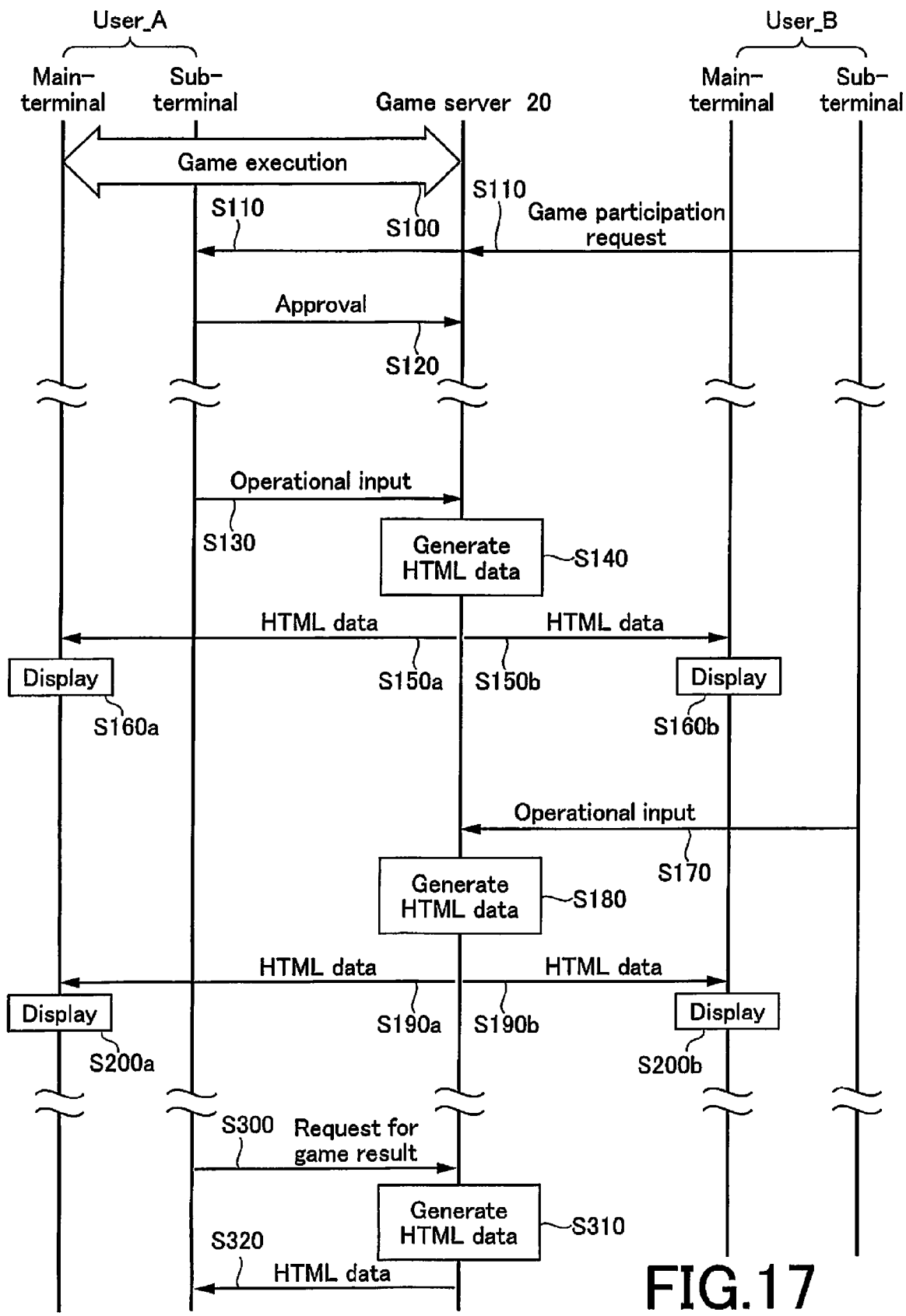
FIG. 17 is a flowchart indicating an example of processing in the case in which friends play the fishing game together in the second embodiment.

FIG. 17 is the flowchart indicating processing performed among a main-terminal, a sub-terminal of User_A, User_B respectively, and the game server 20.

In FIG. 17, a case is assumed in which User_A initially plays the game alone (Step S100). The game server 20 receives a request message (game participation request) specifying User_A (or a user ID of User_A) from the mobile terminal 10b of User_B as sub-terminal. The game server 20 then transmits HTML data to the mobile terminal 10a as sub-terminal of User_A (Step S110). The HTML data is for displaying a web page for requesting a reply to whether to approve the request from User_B. If there is a reply to approve the request from the mobile terminal 10a (Step S120), the game server 20 then registers User_A and User_B as friends by writing data into the field of "user ID of friends" for User_A and User_B in the user database 31. Once User_A and User_B are registered as friends, the game server 20 transmits HTML data of the executed game to the main-terminals of User_A and User_B, in response to an operational input to either one of the sub-terminals of User_A and User_B.

After an operational input is input to the mobile terminal 10a as sub-terminal of User_A for example (Step S130), the game server 20 executes a program in response to the operational input. The game server 20 generates HTML data for displaying a web page that includes the execution result (Step S140). The game server 20 then transmits the HTML data to the PC 12a of User_A and the PC 12b of User_B as respective main-terminals (Step S150a, S150b). Resultantly, web pages based on the HTML data are displayed on the PC 12a and the PC 12b (Step S160a, S160b). For example, in the example illustrated in FIG. 15, after User_A performs an operation of swinging the mobile terminal 10a as sub-terminal, casting the fishing rod object P1a of User_A is displayed on the PC 12a as main-terminal of User_A. Here, casting the fishing rod object P1a of User_A may be also displayed on the PC 12b as main-terminal of User_B.

In the same fashion, after an operational input is input to the mobile terminal 10b as sub-terminal of User_B for example (Step S170), the game server 20 executes a program in response to the operational input. The game server 20 generates HTML data for displaying a web page that includes the execution result (Step S180). Then game server 20 then transmits the HTML data to the PC 12a of User_A and the PC 12b of User_B as respective main-terminals (Step S190a, S190b). Resultantly, web pages based on the HTML data are displayed on the PC 12a and the PC 12b (Step S200a, S200b).

Then, a case is assumed in which the game between User_A and User_B terminates. After User_A performs an operation requesting the game result (a selection operation to the menu m10 in FIG. 16, for example) (Step S300), the game server 20 reads out the game result from the game database 32. Then game server 20 then generates HTML data that includes the game result (Step S310), and transmits the HTML data to the request source mobile terminal 10a of User_A (Step S320).

In the flowchart illustrated in FIG. 17, the game server 20 transmits HTML data to the PC 12a of User_A and the PC 12b of User_B as respective main-terminals in response to an operational input to the mobile terminal 10a of User_A or the mobile terminal 10b of User_B as sub-terminal; however, this is merely an example. The game server 20 may not only transmit the HTML data to the PC 12a of User_A and the PC 12b of User_B as respective main-terminals, but may also transmit HTML data to either or both of the sub-terminals of User_A and User_B (either or both of the mobile terminals 10*a*, 10*b*). The HTML data transmitted to either or both of the sub-terminals may be different from the one transmitted to the main-terminals. In this case, time of the transmission may be at the time of Step S150*a*, S150*b* or Step S190*a*, S190*b* in FIG. 17. The content of the web page displayed based on the HTML data transmitted to the sub-terminal(s) may be set in an appropriate fashion. For example, the web page may include a text that shows a confirmation result of an operational input to the sub-terminal(s), or may include an index value overviewing situation of the game (a content or a score of a fishing result, etc.).

(2-3) Exemplified Gameplay Style 2 in the Case in which Friends Play the Game

Figure 18:
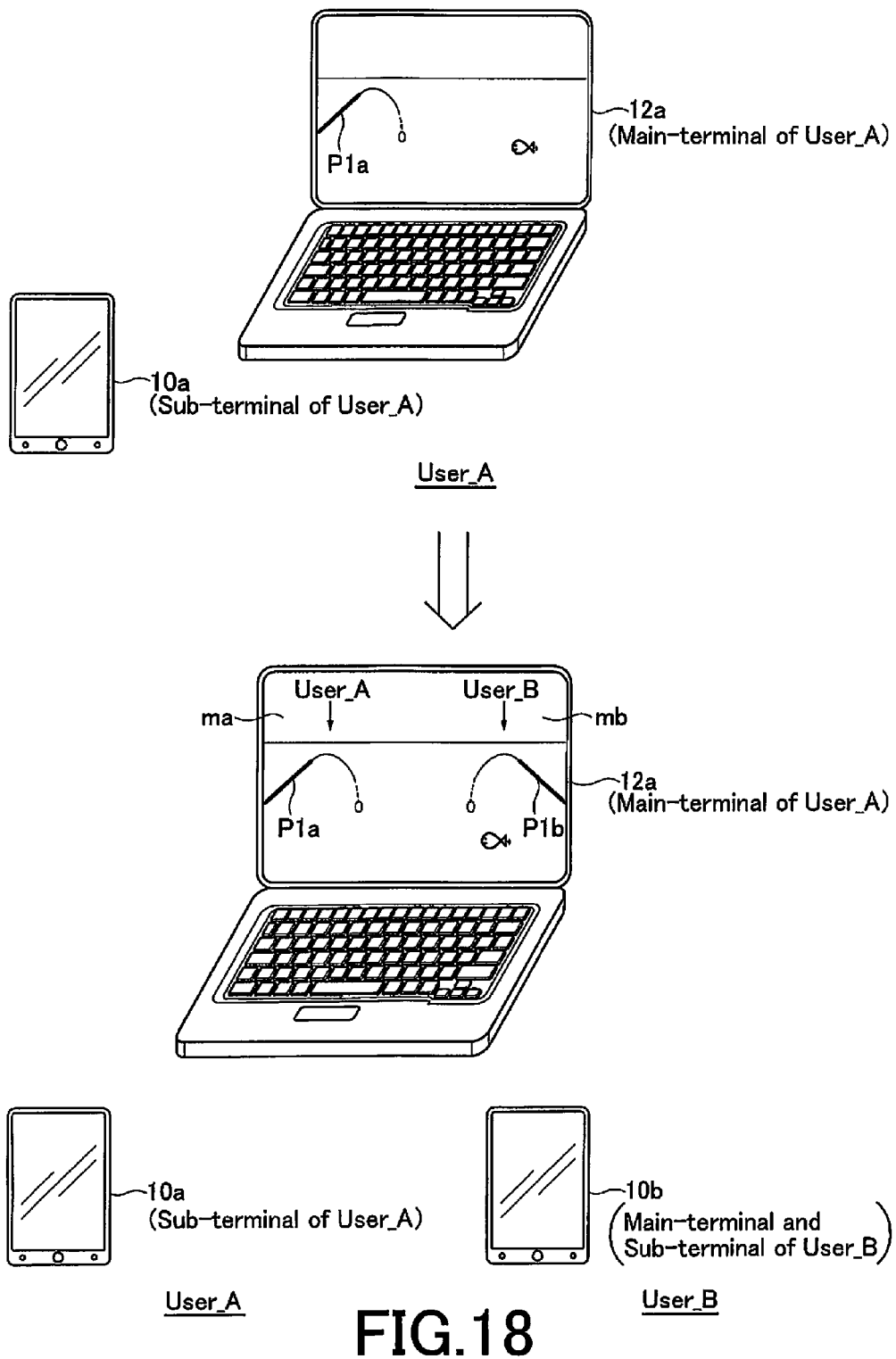
FIG. 18 illustrates conceptually an exemplified gameplay style in the case in which friends play the fishing game together in the second embodiment.

FIG. 18 illustrates conceptually another exemplified gameplay style in the case in which friends play a fishing game together. In this illustrated example, status in which User_A plays the fishing game using the PC 12*a* as main-terminal and the mobile terminal 10*a* as sub-terminal, is shifted to status in which User_B, a friend of User_A, participates in the fishing game using the mobile terminal 10*b* as both main-terminal and sub-terminal (that is, the status in which User_A and User_B play together). In this case, because User_B accesses through a single communication terminal, image that represents a common fishing place is displayed on the PC 12*a* of User_A. In this image, the fishing rod object P1*a* of User_A and the fishing rod object P1*b* of User_B are distinguishably displayed. In FIG. 18, for example, an arrow mark ma is displayed near the fishing rod object P1*a* of User_A on the PC 12*a* of User_A, while an arrow mark mb is displayed near the fishing rod object P1*b* of User_B on the PC 12*b* of User_B. Because a display screen for displaying a fishing place is common for User_A and User_B in this play style unlike FIG. 15, it is preferable that the marks for identifying the fishing rod objects for the respective users include texts for user names or the like.

Next, with reference to a flowchart of FIG. 19, processing will be explained in the case in which the fishing game is performed between friend users as illustrated in FIG. 18. FIG. 18 is the flowchart indicating processing performed among a main-terminal and a sub-terminal of User_A, a main-terminal and a sub-terminal of User_B, and the game server 20.

Figure 19:
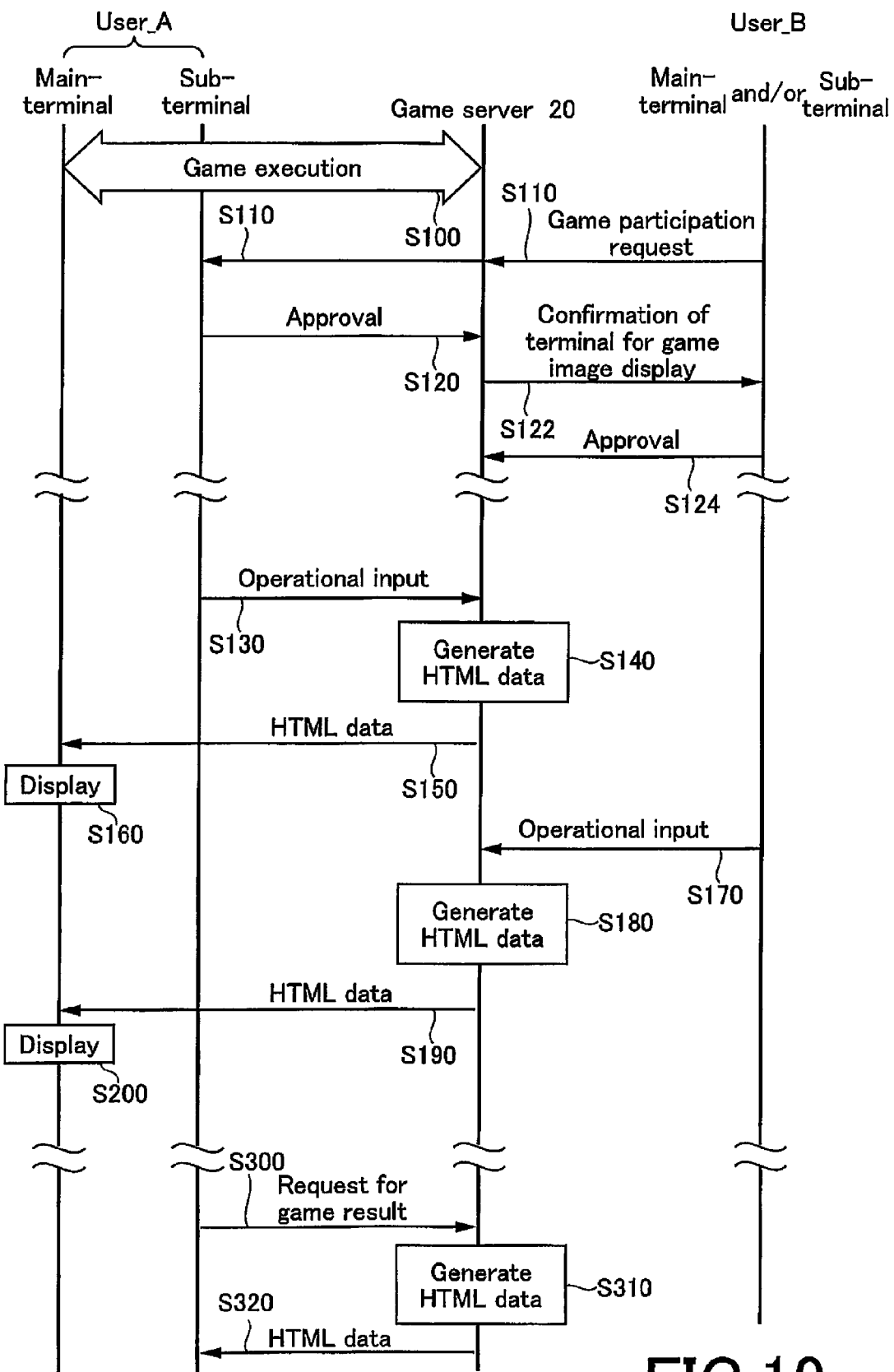
FIG. 19 is a flowchart indicating an example of processing in the case in which friends play the fishing game together in the second embodiment.

In FIG. 19, a case is assumed in which User_A initially plays the game alone (Step S100). The game server 20 receives a request message (game participation request) specifying User_A (or a user ID of User_A) from the mobile terminal 10*b* of User_B as main-terminal and sub-terminal. The game server 20 then transmits HTML data to the mobile terminal 10*a* as sub-terminal of User_A (Step S110). The HTML data is for displaying a web page for requesting a reply to whether to approve the request from User_B. If there is a reply to approve the request from the mobile terminal 10*a* (Step S120), the game server 20 then registers User_A and User_B as friends by writing data into the field of "user ID of friends" of user data for User_A and User_B in the user database 31. After User_A and User_B are registered as friends, the game server 20 recognizes that User_B accesses through a single communication terminal. The game server 20 then transmits a message to the mobile terminal 10*b* of User_B (Step S122). This message is to confirm whether it is okay for User_B to display a game image on the main-terminal (PC 12*a*) of User_A, the friend of User_B. After receiving a message to approve from the mobile terminal 10*b* (Step S124), the game server 20 subsequently transmits HTML data of the executed game to the main-terminal of User_A, in response to an operational input to either one of the sub-terminals of User_A and User_B.

After an operational input is input to the mobile terminal 10*a* as sub-terminal of User_A for example (Step S130), the game server 20 executes a program in response to the operational input. The game server 20 generates HTML data for displaying a web page that includes the execution result (Step S140). The game server 20 then transmits the HTML data to the PC 12*a* of User_A as main-terminal (Step S150). Resultantly, a web page based on the HTML data is displayed on the PC 12*a* (Step S160). For example, in the example illustrated in FIG. 15, after User_A performs an operation of swinging the mobile terminal 10*a* as sub-terminal, casting the fishing rod object P1*a* of User_A is displayed on the PC 12*a* as main-terminal of User_A.

Meanwhile, after an operational input is input to the mobile terminal 10*b* as sub-terminal of User_B for example (Step S170), the game server 20 executes a program in response to the operational input. The game server 20 generates HTML data for displaying a web page that includes the execution result (Step S180). The game server 20 then transmits the HTML data to the PC 12*a* of User_A as main-terminal (Step S190). Resultantly, a web page based on the HTML data is displayed on the PC 12*a* (Step S200). That is, User_B recognizes a change of a content of the game due to User_A's operation through the PC 12*a* of User_A, and also recognizes a change of a content of the game due to User_B's operation through the PC 12*a* of User_A.

Then, a case is assumed in which the game terminates between User_A and User_B. After User_A performs an operation requesting the game result (a selection operation to the menu m10 in FIG. 16, for example) (Step S300), the game server 20 reads out the game result from the game database 32. Then game server 20 then generates HTML data that includes the game result (Step S310), and transmits the HTML data to the request source mobile terminal 10*a* of User_A (Step S320).

In the flowchart illustrated in FIG. 19, the game server 20 transmits HTML data to the PC 12*a* of User_A as main-terminal in response to an operational input to the mobile terminal 10*a* of User_A or the mobile terminal 10*b* of User_B as sub-terminal; however, this is merely an example. The game server 20 may not only transmit the HTML data to the PC 12*a* of User_A as main-terminal, but may also transmit HTML data to either or both of the sub-terminals of User_A and User_B (either or both of the mobile terminals 10*a*, 10*b*). The HTML data transmitted to either or both of the sub-terminals is different from the one transmitted to the main-terminal. In this case, time of the transmission may be at the time of Step S150 or Step S190 in FIG. 19. The content of the web page displayed based on the HTML data transmitted to the sub-terminal(s) may be set in an appropriate fashion. For example, the web page may include a text that shows a confirmation result of an operational input to the sub-terminal(s), or may include an index value overviewing situation of the game (a content or a score of a fishing result, etc.).

Figure 20:
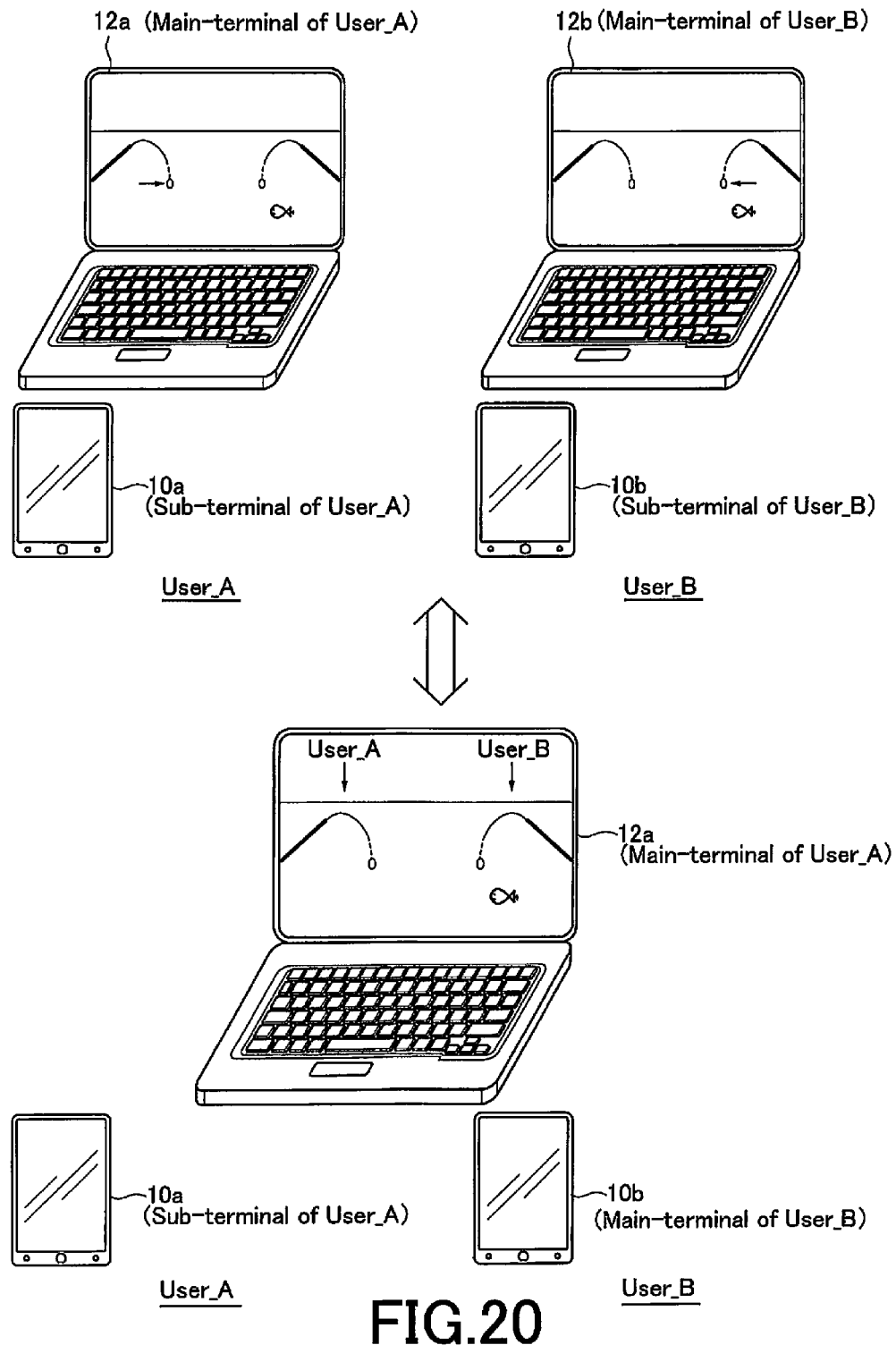
FIG. 20 illustrates conceptually a switch of gameplay style in the case in which friends play a game together in the second embodiment.

As illustrated in FIG. 20, in the case in which friends play the game, the gameplay style 1 (synchronous play with two screens) and the gameplay style 2 (synchronous play with a single screen) described above are preferably configured to be switched upon request from a user. Here, a case is assumed in which User_A and User_B are playing synchronously with two screens for example, and subsequently, access from the PC 12*b* of User_B is disconnected. Then, the game server 20 recognizes the access disconnection by referring to the user database 31. The game server 20 may then switch to synchronous play with a common single screen.

Conversely, a case is assumed in which User_A and User_B are playing synchronously with a common single screen for example, and subsequently, there is an access from the PC 12*b* of User_B. Then, the game server 20 recognizes the access by referring to the user database 31. The game server 20 may then switch to synchronous play with two screens.

As described above, in the game control system of the present embodiment, at least two users are correlated as friend users through predetermined procedures. Game data of the game being executed is transmitted to a main-terminal of one of the two users in response to an operational input to a sub-terminal of another of the two users. Thus, operational inputs from the friends are reflected in contents of the game that are displayed on the communication terminals of the friends. Thereby, the friends can enjoy the game together in the game control system of the present embodiment.

The exemplary embodiments of the present invention have been explained in detail. However, the present invention is not limited to the aforementioned exemplary embodiments. Further, it is apparent that a variety of changes and modifications can be made for the respective exemplary embodiments without departing from the scope of the present invention. Each of the technical features described in the aforementioned embodiments and the modified examples may be combined so long as inconsistency does not occur.

In the second embodiment, the case is described in which two friend users, User_A and User_B, play the game together, for example; however, a number of users playing synchronously is not limited to two. The number may be three or more. For example, User_A approves game participation requests from a plurality of users. Every time the request is approved, data is added into the field of "Friend user ID(s)" in the user database 31. Then, HTML data is generated such that a web page for User_A represents the same game environment as web pages for the plurality of users that game participation requests are transmitted from. Moreover, a web page may be configured to include a menu for recruiting during a period of time participants of a game that the game server 20 starts at a predetermined time. That web page is displayed on communication terminals of respective registered friend users for example. HTML data for the plurality of users may be also generated such that web pages represent the same game environment for the plurality of users who wish to participate in the game during the period of time.

In the embodiments described above, the case is described in which a fishing game is applied; however, applicable types of games are not limited to the fishing game. A motion sensing game is preferable by use of the mobile terminal 10 at user's hand and the PC 12 that the user primarily confirms game progression status with. Such motion sensing game other than the fishing game may be, for example, a bowling game, a darts game, or the like. In the case of the bowling game, throwing a ball is simulated with action of swinging the mobile terminal 10 for example. A result of throwing the ball is determined based on output of three-axis acceleration sensor installed in the mobile terminal 10. A lane and pins are displayed on the PC 12. A user watches the result of throwing the ball on an image of the PC 12. In the case of the darts game, throwing darts is simulated with action of moving the mobile terminal 10 back and forth for example. A result of throwing darts is determined based on output of three-axis acceleration sensor installed in the mobile terminal 10. A darts board is displayed on the PC 12. A user watches an image that shows the result of throwing darts on the PC 12.

Examples have been described in which a game control system is configured with a social network game in the respective embodiments described above; however, the present invention is not limited to the social network game. Similar configuration can be realized with so called cloud gaming (On-demand type game utilizing cloud computing).

<Appendix>

Aspects of the present invention are disclosed hereinafter.

A first aspect of the present invention is a game control device, the device being connected through communication network to a communication terminal operated by a user, the device being configured to control game execution for the user through communication network, the device including:

an accepter configured to accept an access request including user-specific user identification information from at least one communication terminal;

a detector configured to detect accesses from a plurality of communication terminals that are associated with identical user identification information, the plurality of communication terminals including a first communication terminal and a second communication terminal;

a game executer configured to execute a game for a user of user identification information after access from any one of the plurality of communication terminals based on user identification information; and a game controller configured to transmit game data of the game being executed to the second communication terminal in response to an operational input to the first communication terminal, after the detector detects the accesses from the plurality of communication terminals that are associated with the identical user identification information.

With the present game control device, a user may go out with the first communication terminal only, and the user can enjoy a variety of games that would be difficult to realize with the mobile terminal only, by use of the first communication terminal and the second communication terminal existing outside. Particularly, in the case in which the first communication terminal is relatively small mobile terminal, the user can enjoy irrespective of a place where the user is, without need to bring a large input device. For example, the first communication terminal primarily functions as a controller for receiving operational inputs from the user in a game, while the second communication terminal primarily functions as display device for displaying the game image, thereby progressing the game. Moreover, it can be configured such that a screen of the first communication terminal displays one content while a screen of the second communication terminal displays another content. This may enhance entertainment of games.

According to this game control device, the game controller transmits first game data of the game being executed to the first communication terminal, and the game controller transmits second game data of the game being executed to the second communication terminal in response to an operational input to the first communication terminal, the second game data being different from the first game data.

That is, it may be configured such that an image displayed on the first communication terminal is different from one displayed on the second communication terminal in response to an operational input to the first communication terminal. This allows the user to utilize, for game image display, the first communication terminal at the user's hand for operational inputs and the second communication terminal that can be remotely positioned from the user primarily for game image display. Thus, flexibility of games that are realized is enhanced. For example, virtual game space indicating game environment can be displayed on the second communication terminal, while user-specific information such as information indicating game results for respective users for example, or items and objects, etc., that the respective users own in the game can be displayed on the first communication terminal.

This game control device may further include a correlator configured to correlate first user identification information and second user identification information in the game in response to a request from a communication terminal performing an access based on the first user identification information or the second user identification information, wherein an operational input is input to the communication terminal performing access based on one of the first user identification information and the second user identification information, and the game controller transmits game data of the game being executed to a communication terminal performing access based on another of the first user identification information and the second user identification information in response to the operational input.

With this configuration, in response to an operational input of a user to a communication terminal, the game data of the game being executed is transmitted to communication terminal(s) of the other user(s), in the communication among a plurality of users that are correlated. Thus, operational inputs of respective users that are correlated reflects game contents that are displayed on communication terminals of the respective users. This allows the plurality of users to enjoy the game together.

In this game control device, if the first user identification information and the second user identification information are correlated by the correlator, then the game controller transmits data for viewing a game result based on the first user identification information and the second user identification information to the communication terminal performing an access based on the first user identification information or the second user identification information.

A second aspect of the present invention is a non-transitory computer-readable recording medium containing a program for enabling a computer to perform a method, the method comprising:

accepting an access request including user-specific user identification information from at least one communication terminal;

detecting accesses from a plurality of communication terminals that are associated with identical user identification information, the plurality of communication terminals including a first communication terminal and a second communication terminal;

executing a game for a user of user identification information after access from any one of the plurality of communication terminals based on user identification information; and transmitting game data of the game being executed to the second communication terminal in response to an operational input to the first communication terminal, after the accesses are detected from the plurality of communication terminals that are associated with the identical user identification information.

The computer may be, for example, a network server, or a large computer, etc. This program may be stored in a computer-readable information storage medium, such as DVD-ROM, CD-ROM, etc. That is, a third aspect of the present invention is a computer-readable storage medium in which the program described above is recorded.

A fourth aspect of the present invention is a game control method including:

accepting an access request including user-specific user identification information from at least one communication terminal;

detecting accesses from a plurality of communication terminals that are associated with identical user identification information, the plurality of communication terminals including a first communication terminal and a second communication terminal;

executing a game for a user of user identification information after access from any one of the plurality of communication terminals based on user identification information; and transmitting game data of the game being executed to the second communication terminal in response to an operational input to the first communication terminal, after the accesses are detected from the plurality of communication terminals that are associated with the identical user identification information.

A fifth aspect of the present invention is a game control system including a communication terminal operated by a user and a game control device, the device being connected through communication network to the communication terminal, the device being configured to control game execution by the user through communication network, the game control device including:

an accepter configured to accept an access request including user-specific user identification information from at least one communication terminal;

a detector configured to detect accesses from a plurality of communication terminals that are associated with identical user identification information, the plurality of communication terminals including a first communication terminal and a second communication terminal;

a game executer configured to execute a game for a user of user identification information after access from any one of the plurality of communication terminals based on user identification information; and a game controller configured to transmit game data of the game being executed to the second communication terminal in response to an operational input to the first communication terminal, after the detector detects the accesses from the plurality of communication terminals that are associated with the identical user identification information.

What is claimed is:

1. A game control device, the device being connected through a communication network to communication terminals, the device comprising:

an acceptor configured to accept an access request including user-specific user identification information from at least one communication terminal;

a detector configured to detect whether a plurality of communication terminals are concurrently accessing a server in association with identical user identification information, the plurality of communication terminals including a first communication terminal and a second communication terminal;

a game executer configured to execute a game for a user of user identification information after access from any one of the plurality of communication terminals based on user identification information; and a game controller configured to transmit game data of the game being executed to the second communication terminal in response to an operational input to the first communication terminal after the detector detects that the plurality of communication terminals are concurrently accessing the server in association with the identical user identification information.

2. The game control device according to claim 1, wherein the game controller transmits first game data of the game being executed to the first communication terminal, and the game controller transmits second game data of the game being executed to the second communication terminal in response to an operational input to the first communication terminal, the second game data being different from the first game data.

3. The game control device according to claim 1, further comprising a correlator configured to correlate first user identification information and second user identification information in the game in response to a request from a communication terminal performing access based on the first user identification information or the second user identification information, an operational input being input to the communication terminal performing access based on one of the first user identification information and the second user identification information, and the game controller transmitting game data of the game being executed to a communication terminal performing access based on the second user identification information when the operational input is input to the communication terminal performing access based on the first user identification information in response to the operation input, and the game controller transmitting game data of the game being executed to a communication terminal performing access based on the first user identification information when the operational input is input to the communication terminal performing access based on the second user identification information in response to the operational input.

4. The game control device according to claim 3, wherein the game controller transmits data for viewing a game result based on the first user identification information and the second user identification information to the communication terminal performing access based on the first user identification information or the second user identification information.

5. The game control device according to claim 2, further comprising a correlator configured to correlate first user identification information and second user identification information in the game in response to a request from a communication terminal performing access based on the first user identification information or the second user identification information, an operational input being input to the communication terminal performing access based on one of the first user identification information and the second user identification information, and the game controller transmitting game data of the game being executed to a communication terminal performing access based on the second user identification information when the operational input is input to the communication terminal performing access based on the first user identification information in response to the operation input, and the game controller transmitting game data of the game being executed to a communication terminal performing access based on the first user identification information when the operational input is input to the communication terminal performing access based on the second user identification information in response to the operational input.

6. The game control device according to claim 5, wherein the game controller transmits data for viewing a game result based on the first user identification information and the second user identification information to the communication terminal performing access based on the first user identification information or the second user identification information.

7. A non-transitory computer-readable recording medium containing a program for enabling a computer to perform a method, the method comprising:

accepting an access request including user-specific user identification information from at least one communication terminal;

detecting concurrent accesses from a plurality of communication terminals that are associated with identical user identification information, the plurality of communication terminals including a first communication terminal and a second communication terminal;

executing a game for a user of user identification information after access from any one of the plurality of communication terminals based on user identification information; and transmitting game data of the game being executed to the second communication terminal in response to an operational input to the first communication terminal, after the concurrent accesses are detected from the plurality of communication terminals that are associated with the identical user identification information.

8. A game control method comprising:

accepting an access request including user-specific user identification information from at least one communication terminal;

detecting concurrent accesses from a plurality of communication terminals that are associated with identical user identification information, the plurality of communication terminals including a first communication terminal and a second communication terminal;

executing a game for a user of user identification information after access from any one of the plurality of communication terminals based on user identification information; and transmitting game data of the game being executed to the second communication terminal in response to an operational input to the first communication terminal, after the concurrent accesses are detected from the plurality of communication terminals that are associated with the identical user identification information.

9. A game control system that includes communication terminals and a server, the server being connected through a communication network to the communication terminals, the system comprising:

an accepter configured to accept an access request including user-specific user identification information from at least one communication terminal;

a detector configured to detect concurrent accesses from a plurality of communication terminals that are associated with identical user identification information, the plurality of communication terminals including a first communication terminal and a second communication terminal;

a game executer configured to execute a game for a user of user identification information after access from any one of the plurality of communication terminals based on user identification information; and a game controller configured to transmit game data of the game being executed to the second communication terminal in response to an operational input to the first communication terminal, after the detector detects the concurrent accesses from the plurality of communication terminals that are associated with the identical user identification information.

\* \* \* \* \*